United States Patent
Moe et al.

(10) Patent No.: US 12,534,203 B2
(45) Date of Patent: Jan. 27, 2026

(54) PERSON WITH REDUCED MOBILITY STRETCHER AND WHEELCHAIR MONUMENT FOR AIRCRAFT SYSTEMS

(71) Applicant: B/E Aerospace, Inc., Winston Salem, NC (US)

(72) Inventors: Daniel N Moe, Mukilteo, WA (US); Shawn William Raybell, Maple Valley, WA (US)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 18/796,171

(22) Filed: Aug. 6, 2024

(65) Prior Publication Data
US 2024/0391591 A1 Nov. 28, 2024

Related U.S. Application Data

(63) Continuation-in-part of application No. 18/367,041, filed on Sep. 12, 2023.
(Continued)

(51) Int. Cl.
*B64D 11/00* (2006.01)
*A61G 3/08* (2006.01)
*B64C 1/18* (2006.01)

(52) U.S. Cl.
CPC ............ *B64D 11/00* (2013.01); *A61G 3/0808* (2013.01); *A61G 3/0875* (2013.01); *B64C 1/18* (2013.01); *B64D 2011/0092* (2013.01)

(58) Field of Classification Search
CPC ..... B64D 11/00; B64D 11/06; B64D 11/0639; B64D 2011/0046; B64D 2011/0069; B64D 2011/0092
See application file for complete search history.

(56) References Cited

U.S. PATENT DOCUMENTS 4,266,822 A 5/1981 Barecki et al.
4,492,403 A 1/1985 Blomgren et al.
(Continued)

FOREIGN PATENT DOCUMENTS

CA 2737577 2/2019
DE 29924487 6/2003
(Continued)

OTHER PUBLICATIONS

European Patent Office, European Search Report dated Jan. 29, 2024 in Application No. 23197706.7.
(Continued)

*Primary Examiner* — Nicholas McFall
*Assistant Examiner* — Justin Michael Heston
(74) *Attorney, Agent, or Firm* — SNELL & WILMER L.L.P.

(57) ABSTRACT

A monument for installation in an aircraft passenger cabin comprises a housing extending from the floor upwardly toward the ceiling, the housing including a first configuration configured to receive a wheelchair in a first unfolded condition, and a second configuration configured to receive a stretcher in a second unfolded condition, a first interior space formed in the housing, a staircase disposed within the interior space; a second interior space formed in the housing, a first entrance into the first interior space through a door; a second entrance into the second interior space of the housing, and a securement assembly positionable on the floor, the securement assembly configured to secure one of the wheelchair or the stretcher in place within the interior space.

19 Claims, 18 Drawing Sheets

Related U.S. Application Data

(60) Provisional application No. 63/407,062, filed on Sep. 15, 2022.

(56) References Cited

U.S. PATENT DOCUMENTS

| | | | |
|---|---|---|---|
| 6,113,325 | A | 9/2000 | Craft |
| 6,273,366 | B1 | 8/2001 | Sprenger et al. |
| 6,615,421 | B2 | 9/2003 | Itakura |
| 7,866,603 | B2 | 1/2011 | Cooper et al. |
| 8,047,467 | B2 | 11/2011 | Erickson et al. |
| 9,045,231 | B2 | 6/2015 | Swain |
| 9,051,052 | B2 | 6/2015 | Boren |
| 9,139,303 | B2 | 9/2015 | Bechtold et al. |
| 9,180,969 | B2 | 11/2015 | Kunze et al. |
| 9,308,997 | B2 | 4/2016 | Scown et al. |
| 9,688,407 | B2 | 6/2017 | McIntosh |
| 9,708,062 | B2 | 7/2017 | Grant et al. |
| 9,714,094 | B2 | 7/2017 | Ivester |
| 10,287,016 | B2 | 5/2019 | Seibt |
| 10,426,674 | B2 | 10/2019 | Bijl et al. |
| 10,870,489 | B2 | 12/2020 | Dowty |
| 10,933,968 | B2 | 3/2021 | Heidtmann et al. |
| 10,953,987 | B2 * | 3/2021 | Johnson ............. B64D 11/0691 |
| 11,618,570 | B2 | 4/2023 | Roeder |
| 11,794,902 | B2 | 10/2023 | Pothier |
| 2006/0060704 | A1 * | 3/2006 | Lavie .................... A61G 3/001 |
| | | | 244/118.5 |
| 2012/0048998 | A1 | 3/2012 | Schliwa et al. |
| 2012/0261509 | A1 | 10/2012 | Grant et al. |
| 2013/0123075 | A1 | 5/2013 | Hmelnitski |
| 2013/0280002 | A1 | 10/2013 | Giardin et al. |
| 2014/0123571 | A1 | 5/2014 | Swain |
| 2014/0291445 | A1 | 10/2014 | Brauer et al. |
| 2014/0360099 | A1 | 12/2014 | McIntosh |
| 2016/0039522 | A1 | 2/2016 | Koyama et al. |
| 2018/0251222 | A1 | 9/2018 | Banfield et al. |
| 2019/0193859 | A1 | 6/2019 | Waldheuer et al. |
| 2019/0233117 | A1 | 8/2019 | Dowty et al. |
| 2019/0248495 | A1 | 8/2019 | Seibt |
| 2019/0359336 | A1 | 11/2019 | Hough et al. |
| 2020/0039626 | A1 | 2/2020 | Johnson et al. |
| 2020/0180765 | A1 * | 6/2020 | Behr ........................ B64C 1/18 |
| 2021/0276716 | A1 | 9/2021 | Nicholas et al. |
| 2023/0257119 | A1 | 8/2023 | Johnson et al. |
| 2024/0091083 | A1 | 3/2024 | Moe et al. |

FOREIGN PATENT DOCUMENTS

| | | |
|---|---|---|
| EP | 2974960 | 1/2016 |
| EP | 3873311 | 9/2021 |
| WO | 2014201397 | 12/2014 |
| WO | 2016157081 | 10/2016 |
| WO | 2020092325 | 5/2020 |
| WO | 2021040615 | 3/2021 |

OTHER PUBLICATIONS

Glenn Johnson, "Reaction to Collins Onboard Mobility Solution", Collins Aerospace, AIX Expo Hamburg 2024 Onboard Mobility Solution., dated Jun. 11, 2024, pp. 1-7.

John Morris, "Collins Aerospace Joins Race to Add Wheelchair Space to Airplane", Wheelchair Travel, [Online], dated May 31, 2024, pp. 1-6, Retrieved from the Internet: url: https://wheelchairtravel.org/collins-aerospace-joins-race-wheelchair-space-airplanes/, [retrieved on Jul. 29, 2024].

Sean Cudahy, "Delta Demonstrates New Seat Concept, Larger Lavatory for Passengers Who Use Wheelchairs", The Points Guy, [Online], dated Jun. 5, 2024, pp. 1-23, Retrieved from the Internet: url: https://thepointsguy.com/news/delta-flight-products-accessible-seating-lavatory/, [retrieved on Jul. 29, 2024].

USPTO; Ex Parte Quayle Office Action dated Nov. 10, 2025 in U.S. Appl. No. 18/367,041.

* cited by examiner

PERSON WITH REDUCED MOBILITY STRETCHER AND WHEELCHAIR MONUMENT FOR AIRCRAFT SYSTEMS

CROSS-REFERENCE TO RELATED APPLICATIONS

This non-provisional application is a continuation-in-part application that claims the benefit of, and priority to, U.S. Non-Provisional application Ser. No. 18/367,041 filed on Sep. 12, 2023, entitled "MULTI-USE AIRCRAFT MONUMENTS WITH WHEELCHAIR ACCOMMODATIONS," which claims priority to U.S. Provisional Application No. 63/407,062 filed Sep. 15, 2022, entitled "MULTI-USE AIRCRAFT MONUMENTS WITH WHEELCHAIR ACCOMMODATIONS," both of which are hereby incorporated by reference in their entireties for all purposes.

FIELD

The present disclosure generally relates to systems and devices for securing wheelchairs and/or stretchers, and more particularly to aircraft systems and devices for securing wheelchairs and/or stretchers for persons with reduced mobility.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may be inventions.

Aircraft passenger cabins include equipment for serving the needs of traveling passengers. Equipment in a passenger cabin is typically positioned relative to other equipment, aisles, exits, emergency exits, etc., for accessibility and convenience of use. Each piece of equipment in a passenger cabin serves a primary function, such as seating, food and beverage preparation, stowage, etc.

While most passengers are able to board a plane on their own and make use of a standard passenger seat, a PRM requires special boarding procedures and accommodations. For example, a PRM confined to a wheelchair may be transferred from their own wheelchair to a specialized transfer wheelchair dimensioned to traverse a narrow longitudinal aisle. When arrived at their seat, a PRM may be transferred again from the transfer wheelchair to a taxi, take-off, and landing (TTOL) compliant seat, while their own wheelchair is collapsed and stowed in another location in the aircraft, typically outside the passenger cabin. Passenger transfers are not only time consuming, but are disruptive to a PRM, require trained personnel, and invite injury to those involved in the transfer process. In addition, TTOL compliant seats may not be able to accommodate the particular needs of a PRM.

Airlines, various members of the reduced mobility community, and lawmakers have been requesting that passengers of an aircraft with reduced mobility be able to board the aircraft in the passenger's own wheelchairs. This is due to the high rate of loss or damage to expensive (and often medically customized) power wheelchairs. In addition, persons with reduced mobility and/or crew members may be more susceptible to injuries during the wheelchair to seat transfer process. Similarly, baggage handlers may be more susceptible to injury from attempting to lift heavy powered chairs. Some aircrafts may also have to accommodate patients who use stretchers.

SUMMARY

Disclosed herein is a monument for installation in an aircraft passenger cabin having a floor and a ceiling, and an aisle. In various embodiments, the monument comprises a housing comprising a first interior wall, a second interior wall, a first configuration, and a second configuration, the housing extending from the floor upwardly toward the ceiling, the second interior wall extending from the first interior wall toward the aisle, the first configuration configured to receive a wheelchair in a first unfolded condition, the second configuration configured to receive a stretcher in a second unfolded condition; a first interior space formed in the housing; a staircase disposed within the first interior space; a second interior space formed in the housing, the second interior space defined at least partially by the first interior wall positioned adjacent to the staircase, the second interior wall positioned adjacent to the aisle, and an interior ceiling positioned adjacent to the ceiling, the second interior space extending from a first end of the housing to a second end of the housing; a first entrance into the first interior space through a door; a second entrance into the second interior space of the housing; and a securement assembly that is positionable on the floor, the securement assembly configured to secure one of the wheelchair or the stretcher in place within the first interior space.

In various embodiments, the monument further comprises at least one storage compartment positioned in the housing. In various embodiments, the at least one storage compartment comprises first storage compartment positioned in a space formed in the second interior wall. In various embodiments, the at least one storage compartment comprises a second storage compartment spaced apparat vertically from the first storage compartment.

In various embodiments, the monument further comprises a compartment disposed in the second interior wall, wherein: the compartment is configured to receive a portion of the stretcher in the second configuration; and the compartment is closed in the first configuration.

In various embodiments, the monument further comprises a third interior wall spaced apart from the first interior wall, wherein the third interior wall and the first interior wall at least partially define the first interior space. In various embodiments, the door is configured to provide access to the first interior space from an external space relative to the first interior space. In various embodiments, the monument further comprises an opening disposed in the ceiling, wherein the opening defines an exit of the staircase.

In various embodiments, an aircraft comprising the monument installed therein. In various embodiments, the aircraft further comprising an aircraft cabin defined by a fuselage of the aircraft and a crew rest cabin disposed above the aircraft cabin. In various embodiments, the staircase is configured to extend from the aircraft cabin to the crew rest cabin.

An aircraft is disclosed herein. In various embodiments, the aircraft comprises a fuselage; a passenger cabin disposed in the fuselage; a crew rest cabin disposed in the fuselage, the crew rest cabin disposed above the passenger cabin; and a monument comprising a staircase that provides access to the crew rest cabin from the passenger cabin, the monument disposed in the passenger cabin, the monument comprising a securement assembly positioned on a floor, the securement assembly configured to secure one of an occupied wheelchair or an occupied stretcher during operation of the aircraft.

In various embodiments, the monument is configured to transition between a first configuration for receiving the occupied wheelchair and a second configuration for receiving the occupied stretcher. In various embodiments, the monument further comprises a compartment disposed in an interior wall of the monument, wherein the compartment is closed in the first configuration, and wherein the compartment is open in the second configuration. In various embodiments, a portion of the occupied stretcher is configured to be placed within the compartment in the second configuration. In various embodiments, the monument further comprises an interior wall separating a first interior space configured to receive the occupied wheelchair or the occupied stretcher, and a second interior space comprising the staircase.

A method of boarding an occupied stretcher onto an aircraft is disclosed herein. In various embodiments, the method comprises transitioning a monument disposed in a passenger cabin from a first configuration to a second configuration, the first configuration configured to receive an occupied wheelchair, the second configuration configured to receive the occupied stretcher; boarding the occupied stretcher onto the aircraft; and securing, via a securement assembly positioned on a floor of the aircraft, the occupied stretcher to the floor of the aircraft.

In various embodiments, the transitioning the monument from the first configuration to the second configuration comprises opening a compartment disposed in an interior wall of the monument. In various embodiments, responsive to the boarding the occupied stretcher, a portion of the occupied stretcher extends into the compartment.

In various embodiments, the monument comprises a first interior space configured to receive the occupied stretcher and a second interior space with a staircase configured to provide access to a crew rest.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
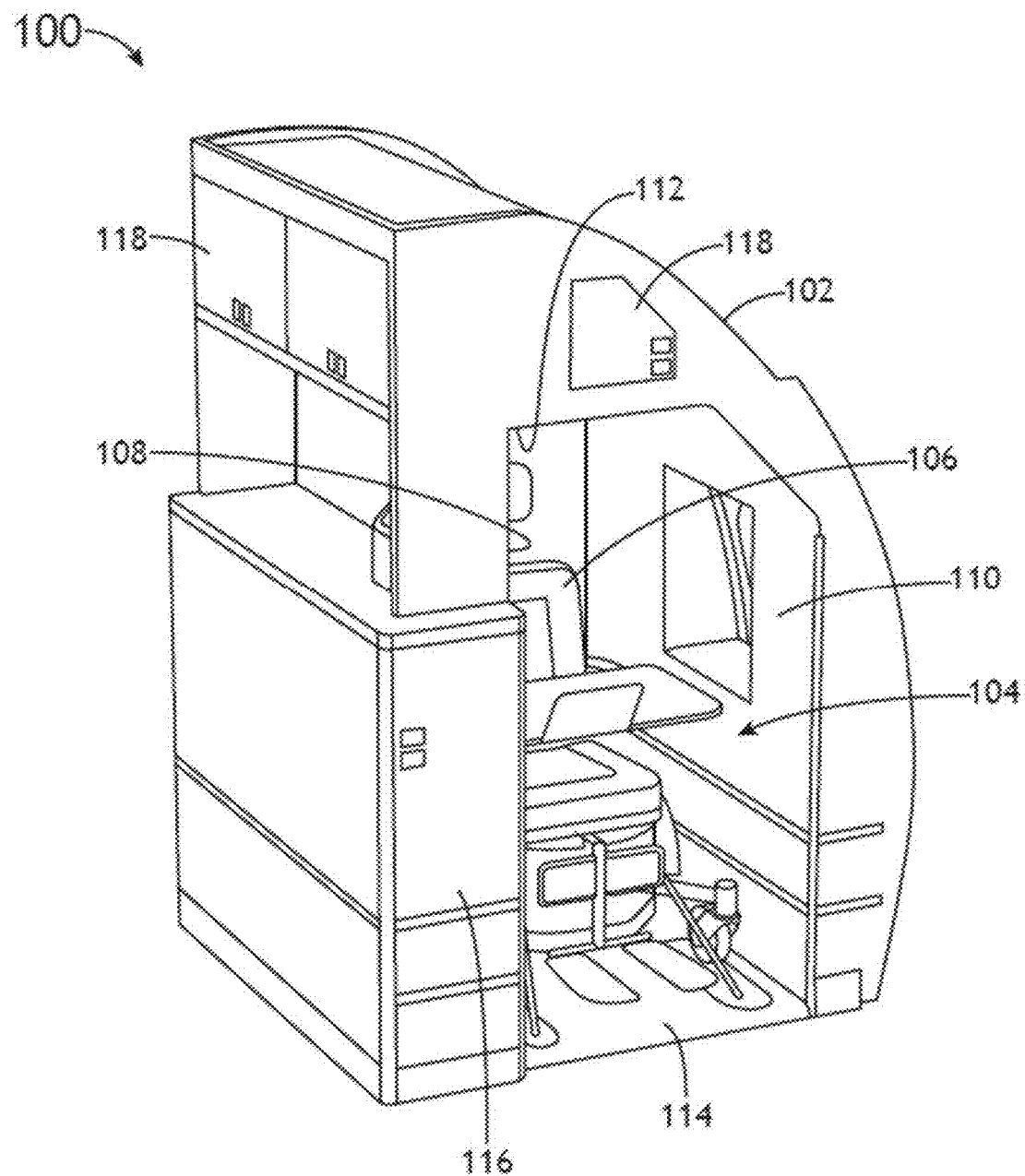
FIG. 1A is a front perspective view of a first multi-use monument having an interior space for accommodating a wheelchair, in accordance with various embodiments.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a system, device, and method for securing a wheeled device (e.g., a wheelchair, a stretcher, or any other wheeled device for transporting persons with reduced mobility) to a cabin floor of an aircraft. A "wheelchair" as disclosed herein, refers to a motorized wheelchair, a manually powered wheelchair, or any other wheeled chair configured to transport an individual from one location to another. In various embodiments, the system adapts non-revenue space on the aircraft to accommodate a wheelchair tiedown and occupant restraint system (WTORS). In various embodiments, the WTORS utilizes a modular approach to surrounding monuments. Below the overhead crew rest and adjacent to the stairway vestibule used to access it, the systems and devices disclosed herein carves out space that would otherwise be used as a galley, lavatory, changing room, or stowage. In various embodiments, this location in the ideal spot for boarding a wheelchair passenger, stretcher patient, or any other person with reduced mobility traveling on a wheeled device. This is a new vestibule design, with a WTORS plinth that can be outfitted with tables, monitors, and passenger safety items, amenities, while retaining some trolley stowage and closet capacity, in accordance with various embodiments. In various embodiments, the system and devices disclosed herein includes development of a WC-19 compliant stretcher with tiedowns.

In various embodiments, the systems, devices, and methods disclosed herein reduce a gate to seat time for a person with reduced mobility by approximately six minutes relative to traditional methods. In various embodiments, the systems methods, and devices disclosed herein provide a better experience for persons with reduced mobility relative to typical methods. As persons with reduced mobility grows in the future (i.e., estimates are an increase from 1% of the population to 2% or more), the systems and methods disclosed may become more vital. In various embodiments, the systems, devices, and methods disclosed herein can improve customer relations and provide enhanced goodwill between the person with reduced mobility community and the airlines. In various embodiments, the systems, devices, and methods disclosed herein can reduce pain and discomfort of persons with reduced mobility relative to typical systems, devices, and methods. In various embodiments, a risk of injury for a person with reduced mobility boarding an aircraft may be reduced by the systems, methods, and devices disclosed herein. In various embodiments, an evacuation time and safety can be improved by the systems and devices disclosed herein. In various embodiments, by being adaptable to carry stretcher patients, an additional potential revenue source can be generated for a respective airline. For example, international air ambulance services can be expensive, so the systems, methods, and devices disclosed herein can reduce costs relative to typical international air ambulance service by incorporating the transportation with commercial travel, in accordance with various embodiments.

Broadly, embodiments of the inventive concepts disclosed herein are directed to multi-use monuments for installation in an aircraft passenger cabin. Each monument provides at least two functions, wherein the first function is wheelchair accommodation, and the second function is unrelated to wheelchair accommodation. In various embodiments, the second function may include, but is not limited to, food and beverage preparation, equipment stowage, and passenger amenity mounting.

In various embodiments, the multi-use monuments provide at least three functions. For example, the multi-use monument can comprise a first configuration configured to receive (and secure) an occupied wheelchair and a second configuration configured to receive (and secure) an occupied stretcher. In various embodiments, the multi-use monument is configured to transition between the first configuration and the second configuration. In various embodiments, the third function may be exclusive use by the cabin crew or equipment for use by the cabin crew to serve the needs of passengers. For example, in various embodiments, the third function includes a staircase that extends from a main cabin up into a crew rest cabin.

In various embodiments, embodiments, the first function (and the second function in various embodiments) is achieved by integrating a dedicated space within the monument dimensioned to receive and position an occupied wheelchair (and after reconfiguration an occupied stretcher), such that a PRM can remain in their own wheeled device (e.g., a wheelchair or a stretcher) during taxi, takeoff, or landing (TTOL). In various embodiments, the monuments disclosed herein include means for securing a wheelchair in place in an unfolded condition, amenities for use by a PRM while positioned relative to the monument, and features enjoyed by a PRM such as direct access to a window.

Benefits of the multi-use monuments disclosed herein include, but are not limited to, dedicated space for accommodating an occupied wheelchair (or an occupied stretcher), monument reconfigurability for flexibility in designing passenger cabin configurations, obviating the need for transfer wheelchairs and PRM wheelchair transfers, maximizing seating density, little to no impact on conventional aircraft passenger cabin floorplans, and enhanced comfort and travel experience for a PRM.

Figure 1B:
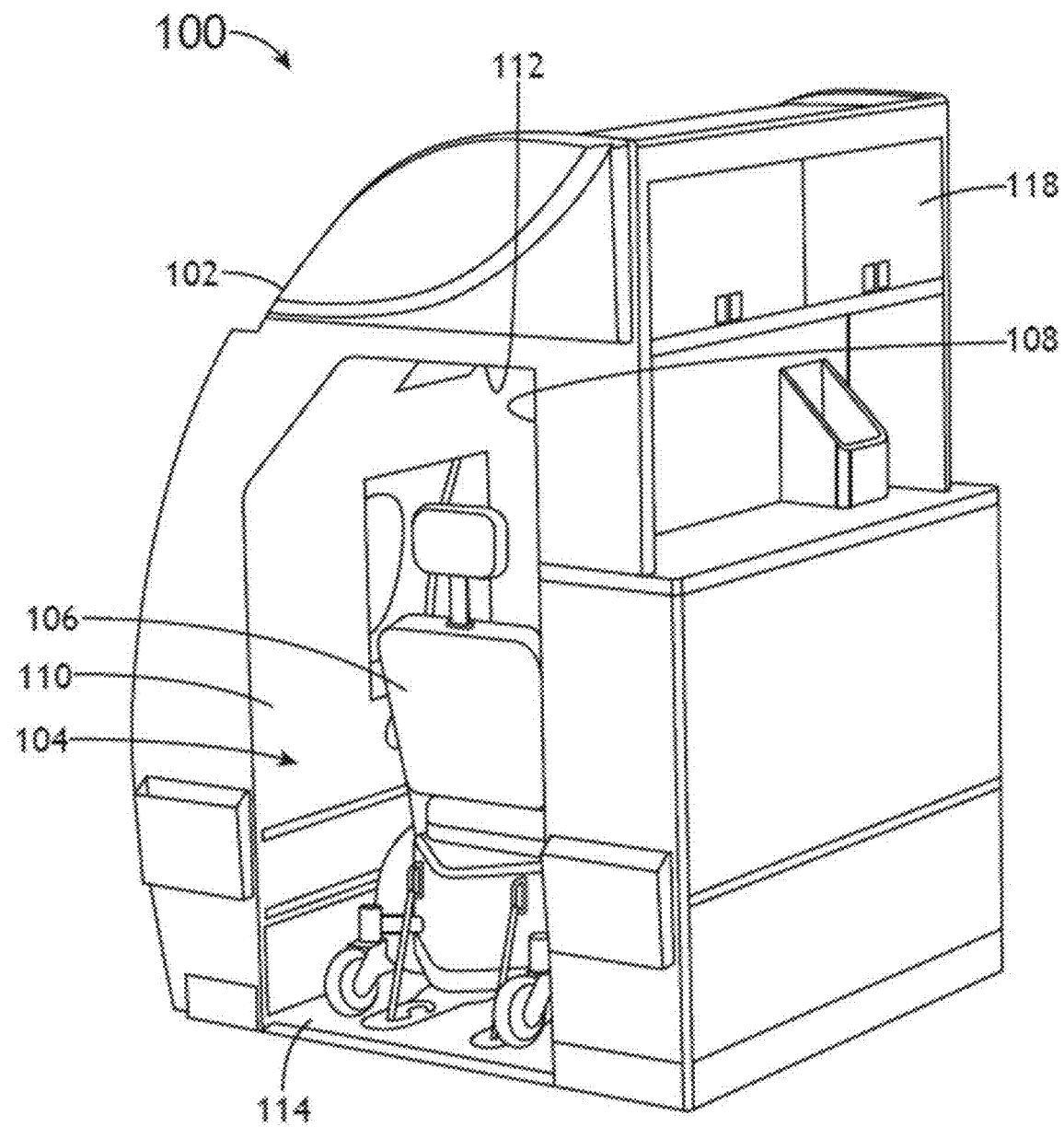
FIG. 1B is a rear perspective view of the monument shown in FIG. 1A, in accordance with one or more embodiments of this disclosure.
Figure 1C:
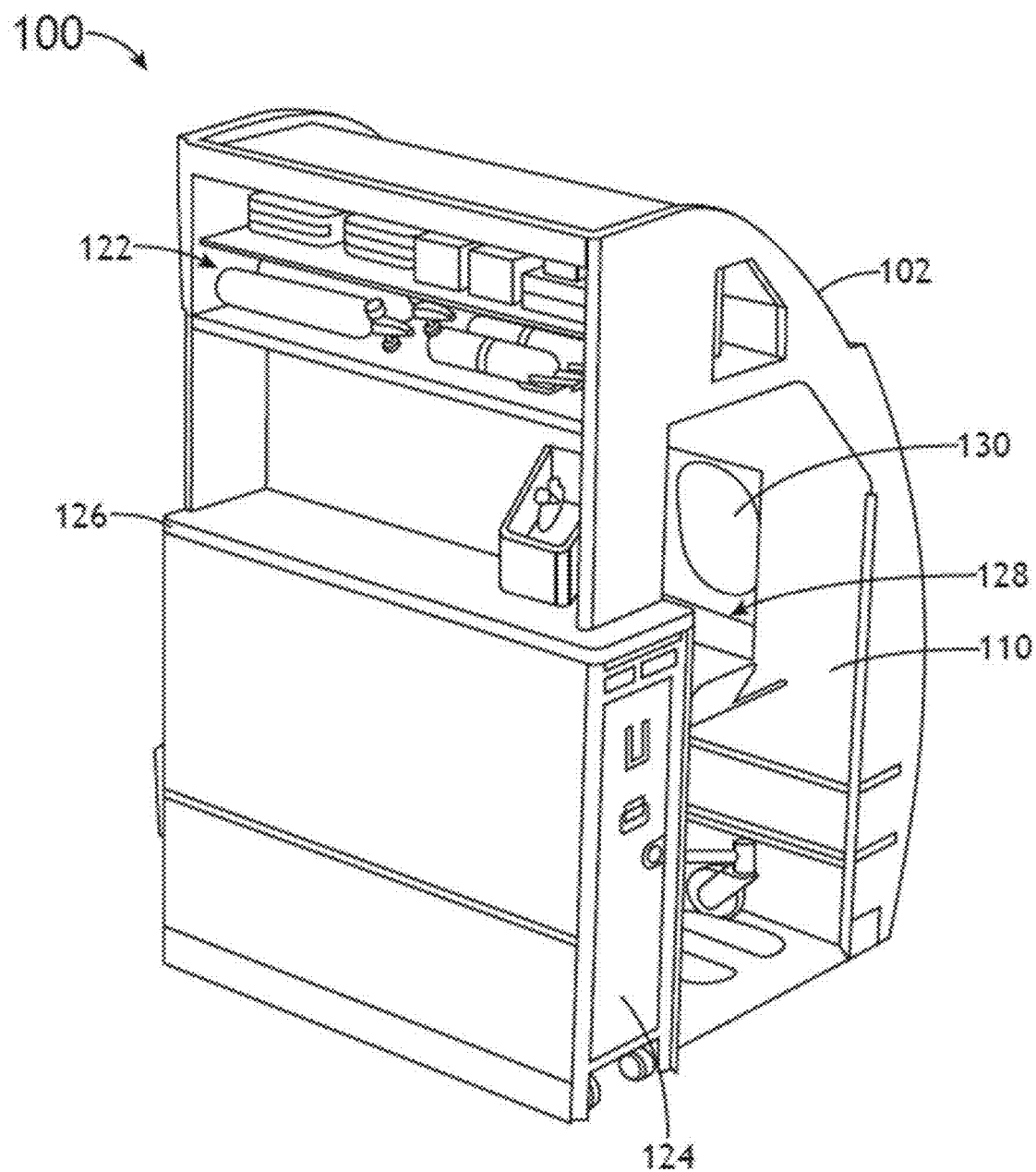
FIG. 1C is an aisle side perspective view of the monument shown in FIG. 1A, in accordance with one or more embodiments of this disclosure.

FIGS. 1A-1C illustrate a monument 100 (e.g., a multi-use monument), in accordance with one or more embodiments of this disclosure. The monument 100 includes a housing 102 having a front, a back, a first side, a second side, a top, and a bottom. In at least various embodiments, when installed in an aircraft passenger cabin, the front may correspond to a forward-facing end, the back may correspond to a rear-facing end, the first side may correspond to an aisle-facing side, and the second side may correspond to an exterior wall (e.g., fuselage) facing side. In at least various embodiments, the housing 102 may extend vertically from the floor to the cabin ceiling, and horizontally from an exterior wall to a longitudinal aisle. As shown, the second side and at least a portion of the top may be convex curved to substantially correspond to the curvature of the fuselage.

An interior space 104 is formed within the housing 102 and is dimensioned to receive and position a wheelchair 106 in an unfolded state, for instance a wheelchair occupied by a PRM. The interior space 104, which may be formed as a tunnel, extends along the longitudinal length of the monument 100 from the front of the housing 102 to the back of the housing 102. The interior space 104 may be open at both ends to provide a first entrance positioned at the front and a second entrance positioned at the back. In this configuration, a wheelchair 106 may enter and exit the interior space 104 from either end, and the wheelchair may be positioned forward-facing or rear-facing depending on one or more of passenger preference, configuration of the wheelchair securement means, position of the monument 100 relative to a lateral aisle, position of the monument 100 relative to an exit, etc.

The interior space 104 is defined by a first interior wall 108 positioned adjacent to the first side, a second interior wall 110 positioned adjacent to the second side, and a ceiling 112 positioned adjacent to the top of the housing 102. In various embodiments in which the monument 100 includes a floor 114 that is integrated with a floor of the aircraft structure (e.g., formed from a single unitary piece with at least a portion of the floor of a cabin in the aircraft), the interior space may be further defined by the floor 114. Various compartments, recesses, openings, etc., may be positioned within the housing 102, and may be left open or covered with a latching door. For example, at least one first compartment 116 may be positioned between the first interior wall 108 and the first side, and at least one second compartment 118 may be positioned between the ceiling 112 and the cabin ceiling. Further compartments may be positioned between the second interior wall 110 and the second side. In various embodiments, the at least one first compartment 116 and the at least one second compartment 118 may be accessible from at least one of the longitudinal aisle and the ends of the monument 100 but may be inaccessible from within the interior space 104. In this configuration, physical separation is provided such that the cabin crew is able to make use of the compartments while a PRM in the interior space has no access to the compartments.

Interior compartments formed within the housing 102 may be located and dimensioned based on the articles intended to be stowed therein to provide customizable stowage solutions. For example, upper compartments positioned adjacent to the ceiling may be used to stow occasional use items such as emergency items including, but not limited to, resuscitators, first aid kits, oxygen bottles, demo kits, radio beacons, oxygen boxes, halon fire extinguishers, and megaphones, whereas lower compartments may be used to stow regular use items such as blankets, pillows, headphones, and cleaning supplies.

FIG. 1C illustrates an exemplary embodiment in which upper compartments are used to stow one or more items 122 for use in an emergency, while lower compartments are used to stow bulky items such as food and beverage carts 124. As shown, cart garages may be positioned and accessible at one or more ends of the monument 100 for stowing one or more food and beverage carts 124 between uses. In various embodiments, the monument 100 may include cart garages that are accessible at one or more ends of the housing 102, a countertop 126 positioned atop the cart garages which is accessible from the aisle, and upper compartments spaced above the countertop 126 also accessible from the aisle. In various embodiments, the first function may be wheelchair accommodation and the second function may be a galley.

The interior space 104 provides a dedicated place within the aircraft passenger cabin for positioning a PRM during TTOL and flight. The monument 100 may be customized to serve the specialized needs of a PRM. For example, equipment associated with a particular health condition may be housed within the monument 100 for use as needed. In various embodiments, a reading light, ventilation controller, and crew call button may be located in a passenger control unit mounted in the ceiling. In various embodiments, emergency use equipment such as a deployable oxygen mask may be located in the ceiling. In various embodiments, the second interior wall 110 may define an opening 128 for alignment with an exterior window 130, such that the PRM has direct window access to enhance the travel experience. In the case of a sufficient longitudinal length, the monument 100 may be equipped with at least two openings for alignment with at least two exterior windows.

Figure 1D:
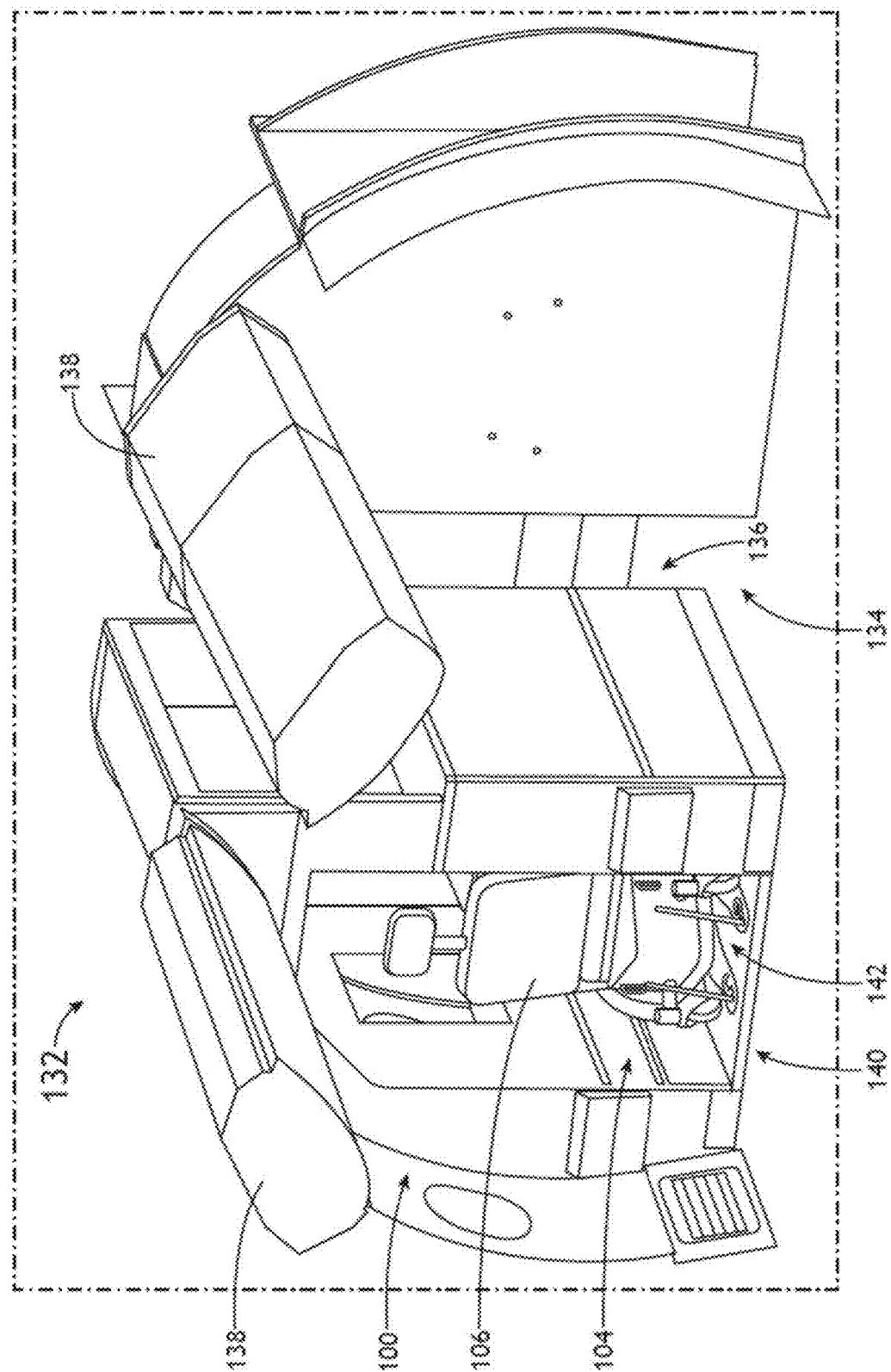
FIG. 1D is a perspective view of a portion of an aircraft passenger cabin equipped with the monument shown in FIG. 1A, in accordance with one or more embodiments of this disclosure.

FIG. 1D illustrates the monument 100 positioned in a portion of a passenger cabin 132 of an aircraft. The passenger cabin 132 of the aircraft as shown includes a longitudinal aisle 134 oriented parallel to the aircraft longitudinal axis, a lateral aisle 136 extending from the longitudinal aisle to an exit door, and a plurality of overhead luggage bins 138. The passenger cabin shown is an exemplary configuration for a narrow body aircraft including a single center aisle. The monument 100 is shown positioned adjacent to the longitudinal aisle 134 on one side, adjacent to the exterior wall on the opposite side, and adjacent to the lateral aisle 136 at the front end. In this position, the forward end of the interior space 104 opens directly to the lateral aisle 136 such that the interior space 104 is nearest the exit door for entering and exiting the aircraft. In this configuration, it may not be necessary for the wheelchair 106 to make use of the longitudinal aisle 134. As such, the lateral aisle 136 can be dimensioned to accommodate the wheelchair 106 while the longitudinal aisle 134 can be made comparatively narrower to maximize passenger seating space and/or seating density.

In various embodiments, a configuration of the passenger cabin 132 of an aircraft may further include a second lateral aisle 140, parallel to the lateral aisle 136, positioned adjacent to the rear facing end of the monument 100. The first row of passenger seats (not shown) may be spaced apart from the monument 100 by a distance corresponding to the width of the second lateral aisle 140. In this configuration, a second aisle is provided to enter and exit the wheelchair 106 from the interior space 104. At least one passenger seat positioned in the first row of seats may be associated with the interior space 104, for instance reserved for a caregiver traveling with the PRM. In various embodiments, depending on the number of PRM spaces desired in the cabin, two of the monument 100 may be positioned on opposite sides of the longitudinal aisle 134 in a symmetrical configuration (i.e., symmetrical about vertical plane through a central longitudinal axis of the longitudinal aisle 134). While both of the monument 100 may include an interior space for accommodating a wheelchair, the second function for each monument may be different, e.g., galley versus stowage.

FIG. 1D further illustrates an assembly 142 for securing a wheelchair 106 in place within the interior space 104. In various embodiments, the assembly 142 includes a platform for positioning on the cabin floor, at least one retractable tie-down mounted to the platform, and at least one tie-down strap for attachment between a respective tie-down and the wheelchair. In use, toe-downs and strap may be positioned at the front, back and sides of the wheelchair. In various embodiments, the platform may be integrated into the cabin floor to eliminate a step-up/step-down.

Figure 2A:
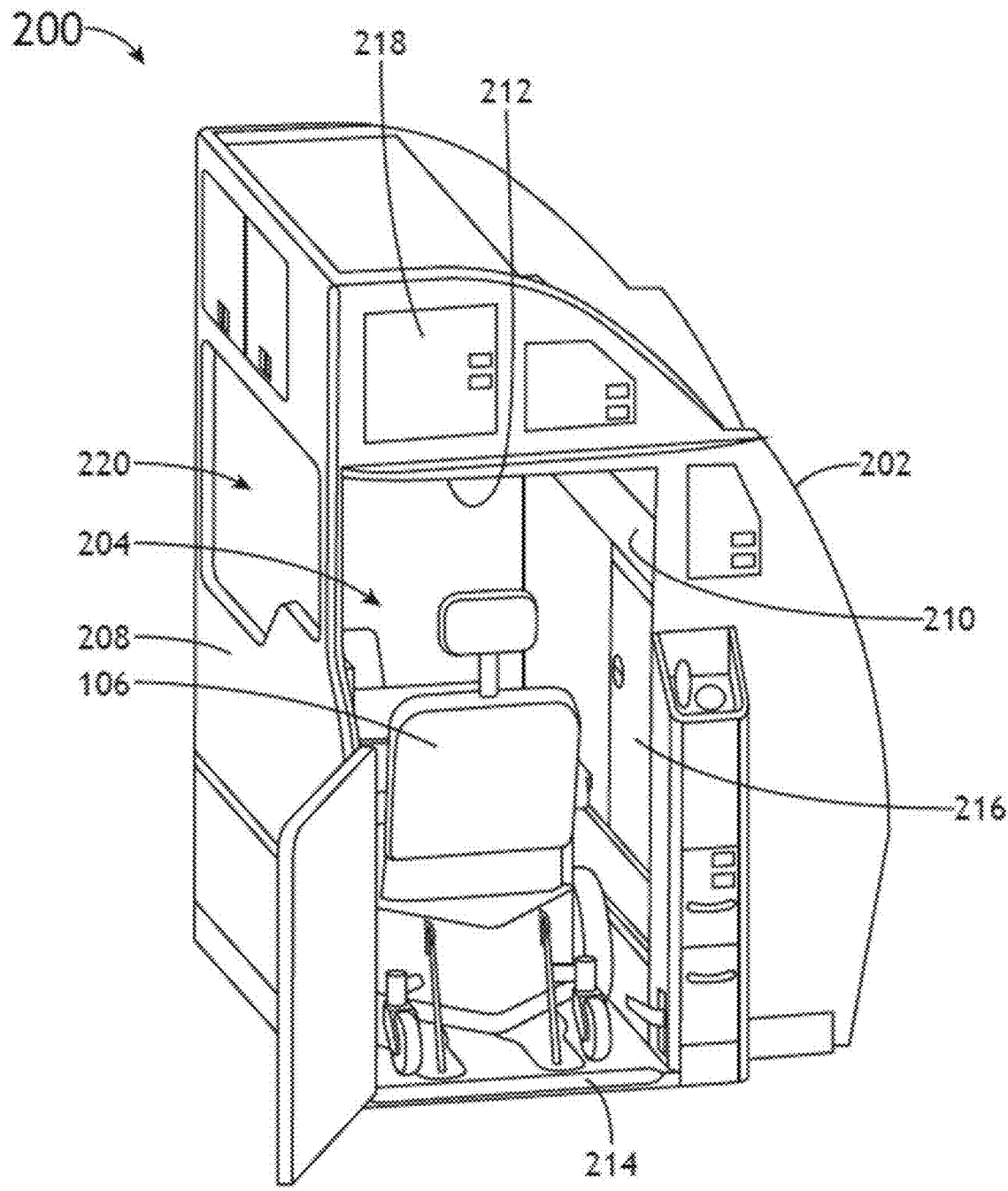
FIG. 2A is a front perspective view of a second multi-use monument having interior space for accommodating a wheelchair, in accordance with one or more embodiments of this disclosure.
Figure 2B:
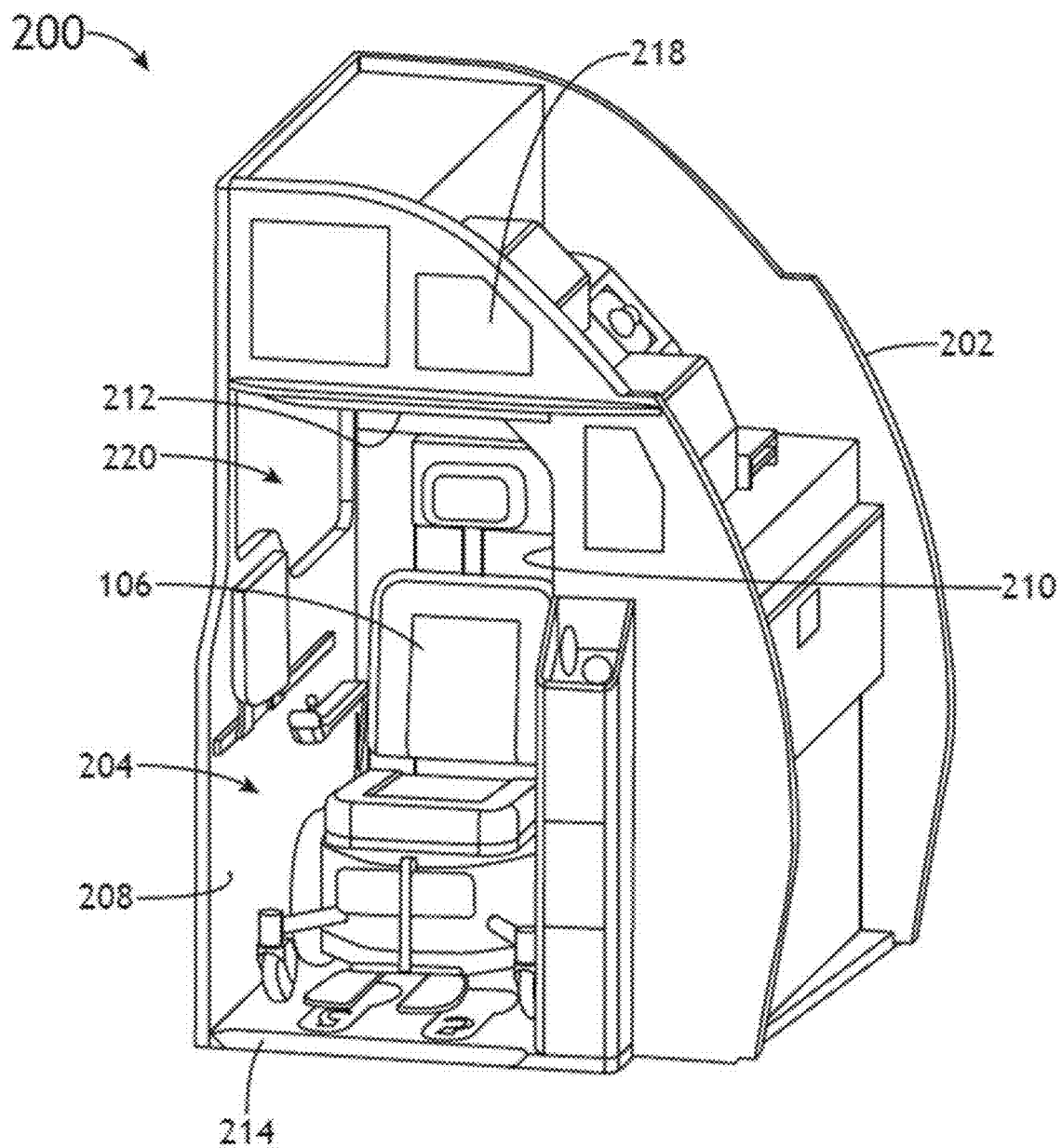
FIG. 2B is a fuselage side perspective of the monument shown in FIG. 2A, in accordance with one or more embodiments of this disclosure.

FIGS. 2A-2B illustrate another monument 200 (e.g., a multi-use monument), in accordance with one or more embodiments of this disclosure. The monument 200 also includes a housing 202 having a front, a back, a first side, a second side, a top, and a bottom. In at least various embodiments, when installed in a passenger cabin of an aircraft, the front may correspond to a forward-facing end, the back may correspond to a rear-facing end, the first side may correspond to an aisle-facing side, and the second side may correspond to an exterior wall (e.g., fuselage) facing side. In at least various embodiments, the housing 202 may extend vertically from the floor to the cabin ceiling, and horizontally from an exterior wall to a longitudinal aisle. As shown, the second side and at least a portion of the top may be convex curved to substantially correspond to the curvature of the fuselage.

The monument 200 also includes an interior space 204 formed within the housing 202 and is dimensioned to receive and position a wheelchair 106 in an unfolded state, for instance a wheelchair occupied by a PRM. The interior space 204 also extends through the longitudinal length of the monument 200 from front to the back and may be open at both ends to provide a first entrance and a second entrance. As shown, the wheelchair 106 is oriented facing the rear.

The interior space 204 is also defined by a first interior wall 208, a second interior wall 210, and a ceiling 212. In various embodiments in which the monument 200 includes a floor 214 that is integrated with a floor of the aircraft structure (e.g., formed from a single unitary piece with at least a portion of the floor of a cabin in the aircraft), the interior space may be further defined by the floor 214. Various compartments, recesses, openings, etc., may be positioned within the housing 202, and may be left open or covered with a latching door. Like the monument 100 from FIGS. 1A-D, at least one compartment 218 may be positioned between the ceiling and the top of the housing 202.

At least one first compartment 216 may be positioned between the second interior wall 210 and the second side of the housing 202, such that the at least one first compartment 216 is accessible from within the interior space 204. This configuration provides a comparatively thinner wall adjacent to the longitudinal aisle, eliminates lower compartments accessible at the longitudinal aisle, eliminates direct access to an exterior window, and introduces a window 220 positioned in the first interior wall and open to the longitudinal aisle.

Figure 2C:
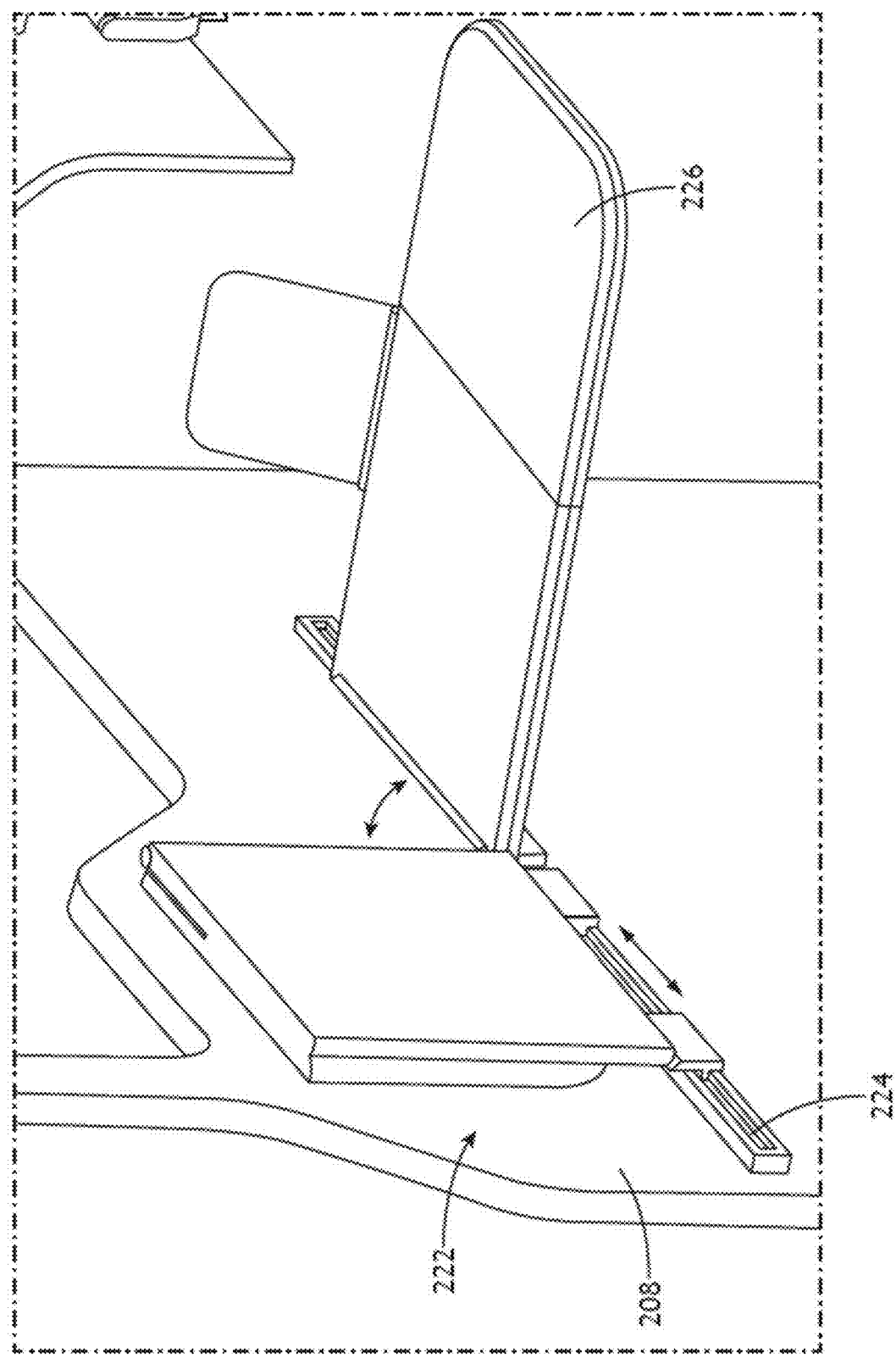
FIG. 2C is an enlarged perspective view of a tray table assembly for installation in the monuments of the present disclosure, in accordance with one or more embodiments of this disclosure.

FIG. 2C illustrates a tray table assembly 222 configured to be mounted for use within the interior space 204. In various embodiments, the tray table assembly 222 includes a horizontal rail 224 configured to be mounted to an interior wall, for example the first interior wall 208. The horizontal rail 224 includes a track defining a horizontal motion path. A tray table 226 is slidably and/or rotatably mounted to the horizontal rail 224. In various embodiments, two or more of the tray table 226 are each slidably and/or rotatably mounted to the horizontal rail 224. In various embodiments, the tray table 226 may be a bi-fold tray table. In use, each tray table 226 may be configured to unfold for use, fold for stowing, rotate toward horizontal for use, rotate toward vertical for stowing, and track horizontal to position the tray table as desired. The tray table assembly 222 is compatible for use with any of the monument embodiments according to the present disclosure.

Figure 2D:
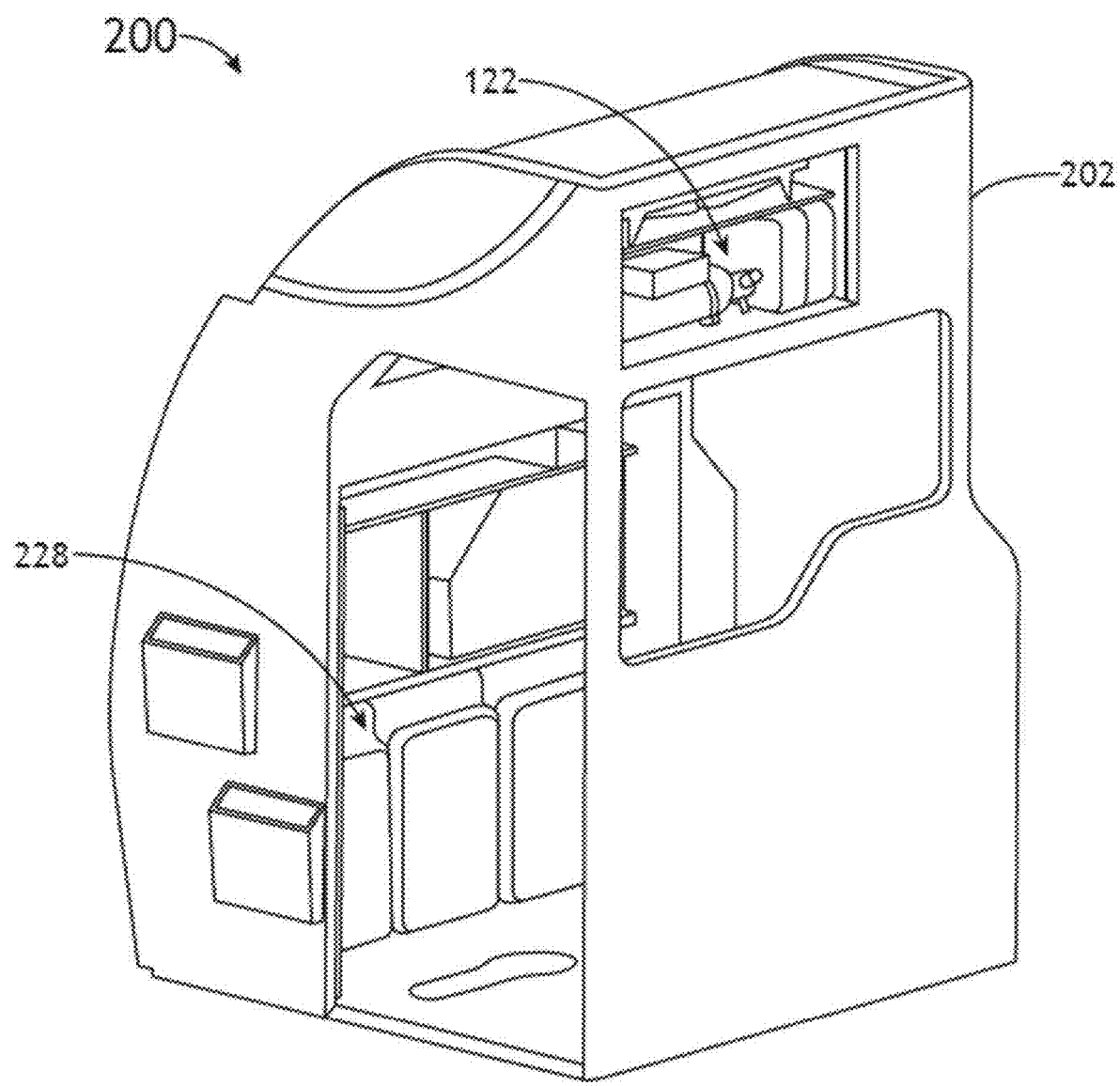
FIG. 2D is a rear perspective view of the monument shown in FIG. 2A, in accordance with one or more embodiments of this disclosure.

FIG. 2D illustrates interior compartments positioned within the housing 202 and dimensioned for use based on articles intended to be stowed therein. For example, upper compartments positioned adjacent to the ceiling and accessible from the longitudinal aisle may be used to stow occasional use items such as the one or more items 122 for use in an emergency including, but not limited to, resuscitators, first aid kits, oxygen bottles, demo kits, radio beacons, oxygen boxes, halon fire extinguishers, and megaphones, whereas the compartments accessible from within the interior space may be used to stow items such as luggage 228 belonging to the of the cabin crew and/or the PRM, equipment associated with a particular health condition of the PRM for use as needed, etc.

Figure 2E:
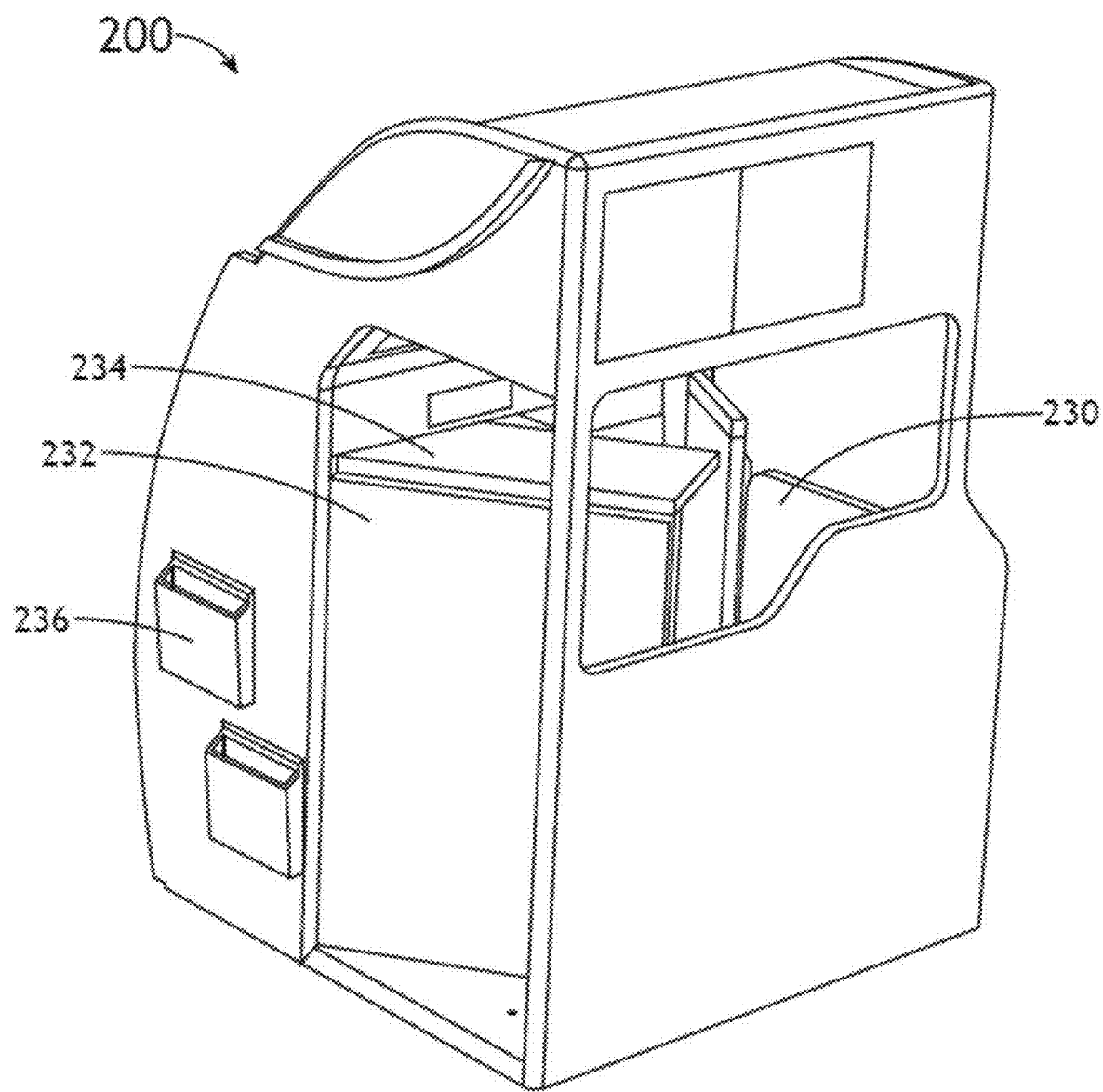
FIG. 2E is a rear perspective view of the monument shown in FIG. 2A illustrating a swinging door, in accordance with example embodiments of this disclosure.

FIG. 2E illustrates a particular configuration of the monument 200 including a door 230 associated with the first entrance and a door 232 associated with the second entrance. In various embodiments, the doors 230, 232 may swing or slide, and at least one of the doors may include a table 234 mounted to the door and configured to rotate into position for use and stow against the door between uses. In various embodiments, literature pockets 236 and other amenities may be mounted to the monument for use by passengers seated facing the monument.

Figure 2F:
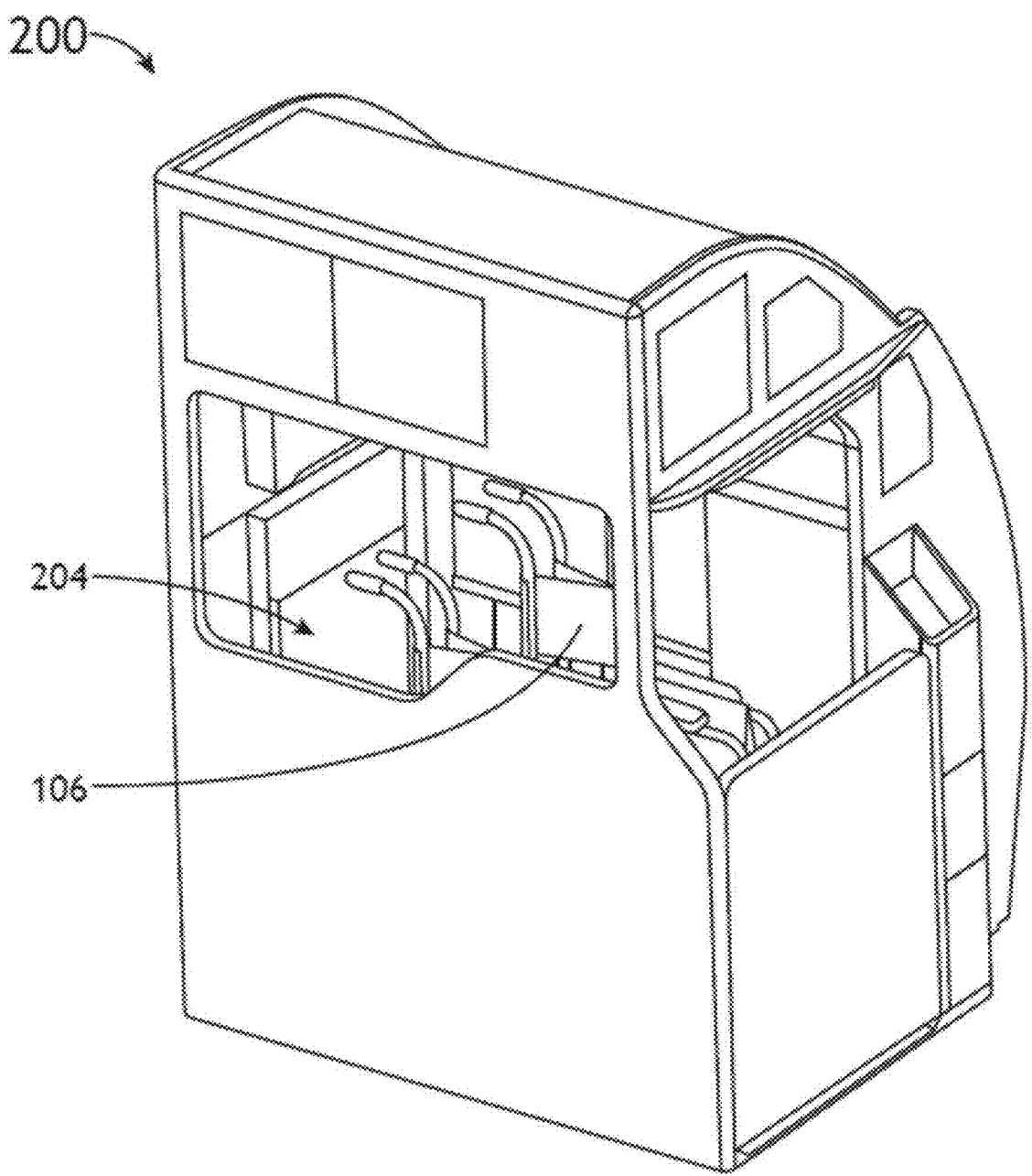
FIG. 2F is an aisle side perspective view of the monument shown in FIG. 2A illustrating wheelchair stowage, in accordance with one or more embodiments of this disclosure.
Figure 2G:
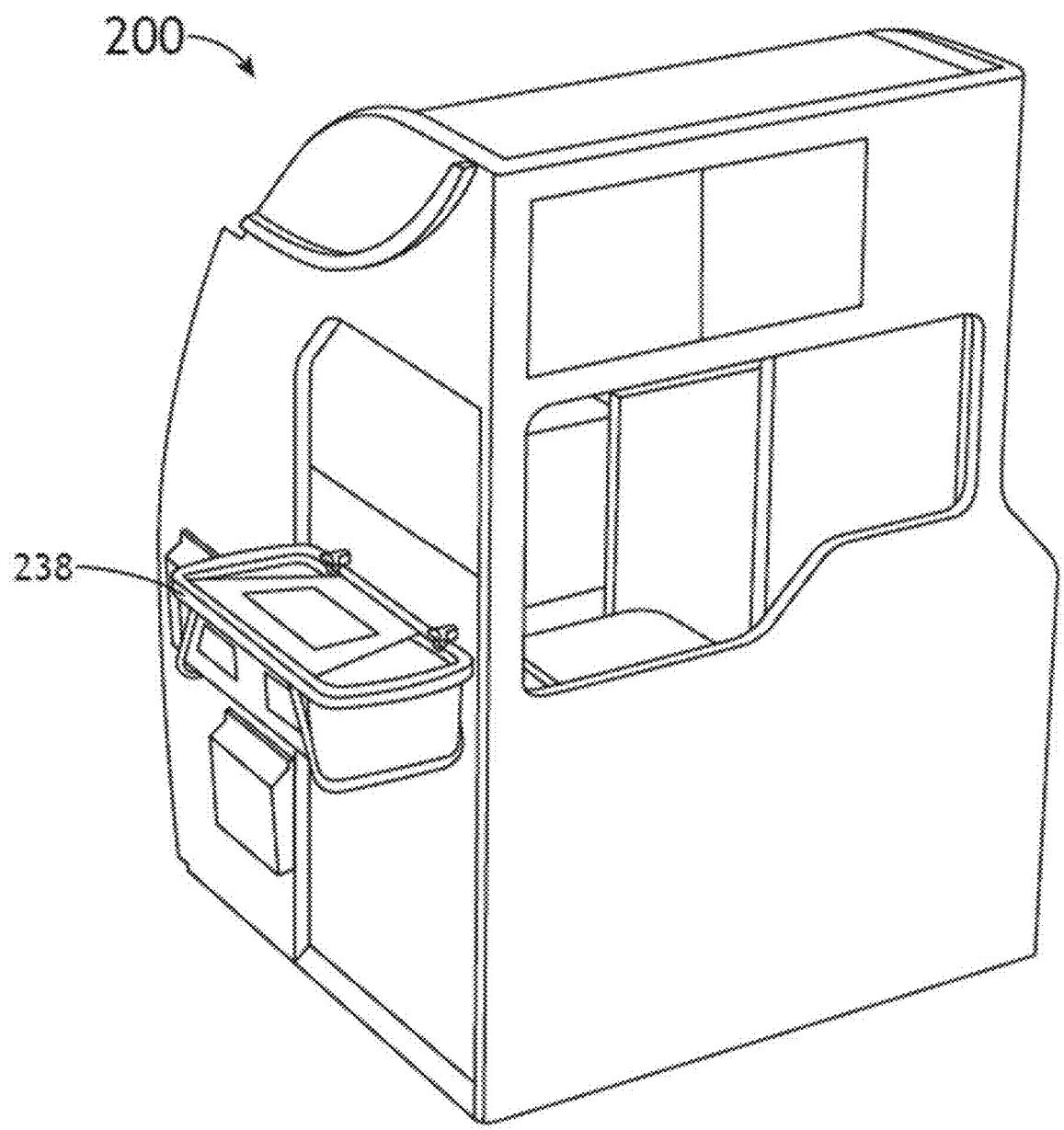
FIG. 2G is a rear perspective view of the monument shown in FIG. 2A illustrating a mountable bassinet, in accordance with one or more embodiments of this disclosure.

FIG. 2F illustrates the interior space 204 of the monument 200 being utilized to stow more than one of the wheelchair 106, with each of the wheelchair 106 that is stowed being in a folded state. In various embodiments, the monument 200 may be accessorized. FIG. 2G illustrates a bassinet 238 mounted to an exterior wall of the monument 200, for example an end wall or door facing the first seat row (not shown).

Figure 3A:
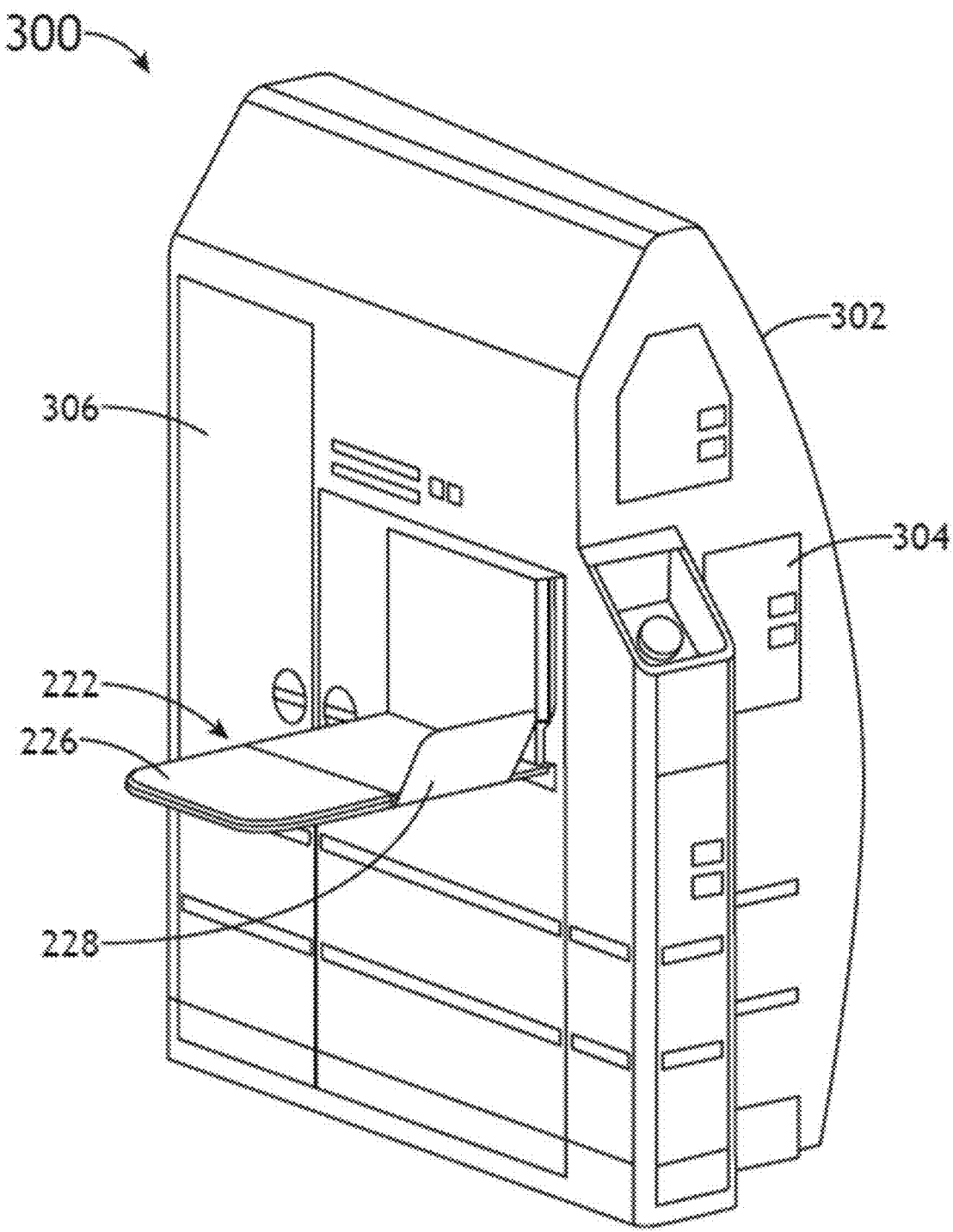
FIG. 3A is a front perspective view of a third multi-use monument for use adjacent a dedicated wheelchair space, in accordance with one or more embodiments of this disclosure.

FIG. 3A illustrates a further monument 300 (e.g., a multi-use monument), in accordance with one or more embodiments of this disclosure. The monument 300 includes a housing 302 also having a front, a back, a first side, a second side, a top, and a bottom. In at least various embodiments, when installed in a passenger cabin of an aircraft, the front may correspond to a forward-facing end, the back may correspond to a rear-facing end, the first side may correspond to an aisle-facing side, and the second side may correspond to an exterior wall (e.g., fuselage) facing side. In at least various embodiments, the housing 302 may extend vertically from the floor toward the cabin ceiling, and horizontally from an exterior wall toward a longitudinal aisle. As shown, the second side and at least a portion of the top may be convex curved to substantially correspond to the curvature of the fuselage.

The monument 300 is configured to be positioned to one side of a dedicated space for accommodating a wheelchair. In various embodiments, the monument 300 includes internal compartments 304 accessible from at least one end of the housing 302, and internal compartments 306 accessible from the first side of the housing 302. The internal compartments 304, 306 may be dimensioned according to their relative position within the housing and items to be stowed in the monument 300. In various embodiments, a tray table assembly, for instance the tray table assembly 222 discussed above, may be mounted to the first side such that tray table 226 deploys toward the longitudinal aisle. In various embodiments, the tray table assembly 222 may include a deployable device holder rotatably attached to the tray table 226.

Figure 3B:
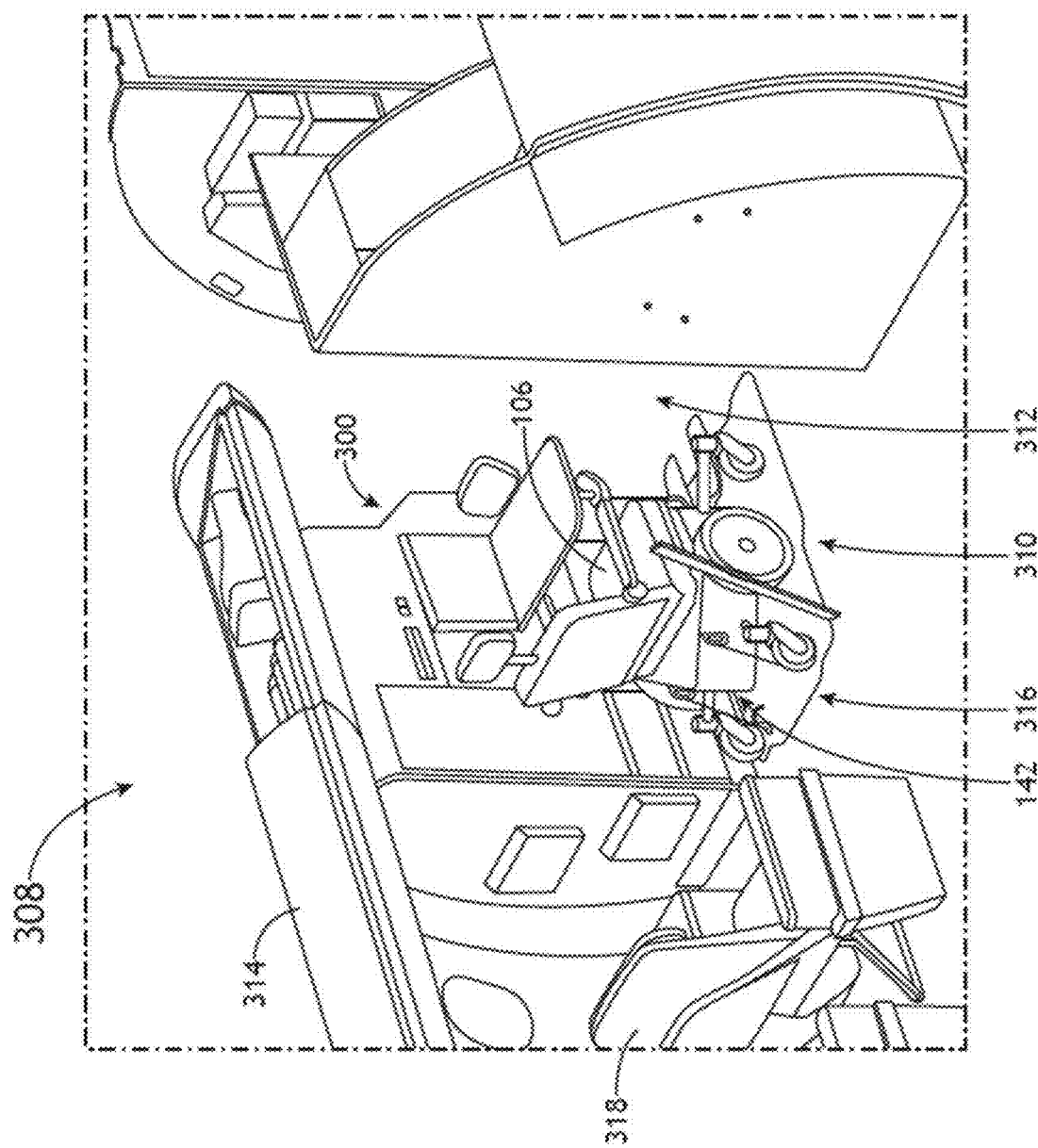
FIG. 3B is a perspective view of a portion of an aircraft passenger cabin equipped with the monument shown in FIG. 3A, in accordance with one or more embodiments of this disclosure.

FIG. 3B illustrates the monument 300 positioned in a portion of a passenger cabin 308 of an aircraft. The passenger cabin 308 of an aircraft as shown includes a longitudinal aisle 310 oriented parallel to the aircraft longitudinal axis, a lateral aisle 312 extending from the longitudinal aisle to an exit door (not shown), and a plurality of overhead luggage bins 314. The passenger cabin shown is an exemplary configuration for a narrow body aircraft including a single center aisle. The monument 300 is shown positioned to one side of the longitudinal aisle 310, adjacent to the exterior wall, adjacent to the lateral aisle 312 at the front end, and adjacent to a wheelchair parking space 316 adjacent to each of the longitudinal aisle 310 and the lateral aisle 312. In this configuration, the wheelchair parking space 316 flows directly into each of the longitudinal aisle 310 and the lateral aisle 312 nearest the exit door for entering and exiting the aircraft.

In various embodiments, the monument 300 may be dimensioned to fit directly below one or more overhead luggage bins 314. The first row of passenger seats 318 may be spaced apart from the monument 300 by a predefined distance, and at least one passenger seat positioned in the first row of passenger seats 318 may be associated with the wheelchair parking space 316, for instance reserved for a caregiver traveling with the PRM. In various embodiments, depending on the number of PRM spaces desired in the cabin, two of the monument 300 may be positioned on opposite sides of the longitudinal aisle 310 in a symmetrical configuration. While both of the monument 300 may include features for serving a PRM, the second function for each monument may be different, e.g., galley versus stowage. FIG. 3B further illustrates the assembly 142 for securing a wheelchair 106 in place as discussed above.

Figure 4A:
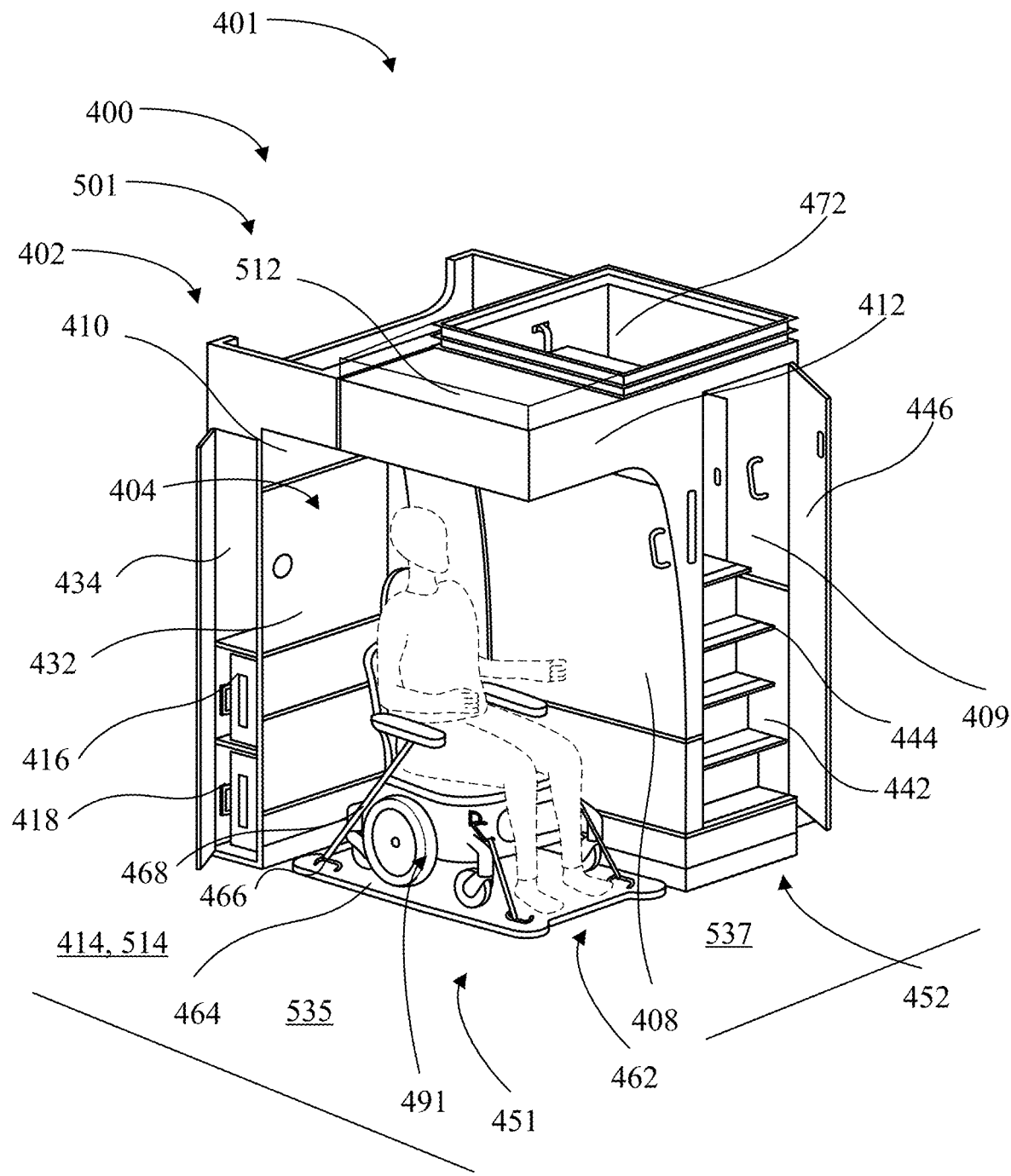
FIG. 4A is a perspective view of a monument in a first configuration configured to receive an occupied wheelchair, in accordance with one or more embodiments of this disclosure.
Figure 4B:
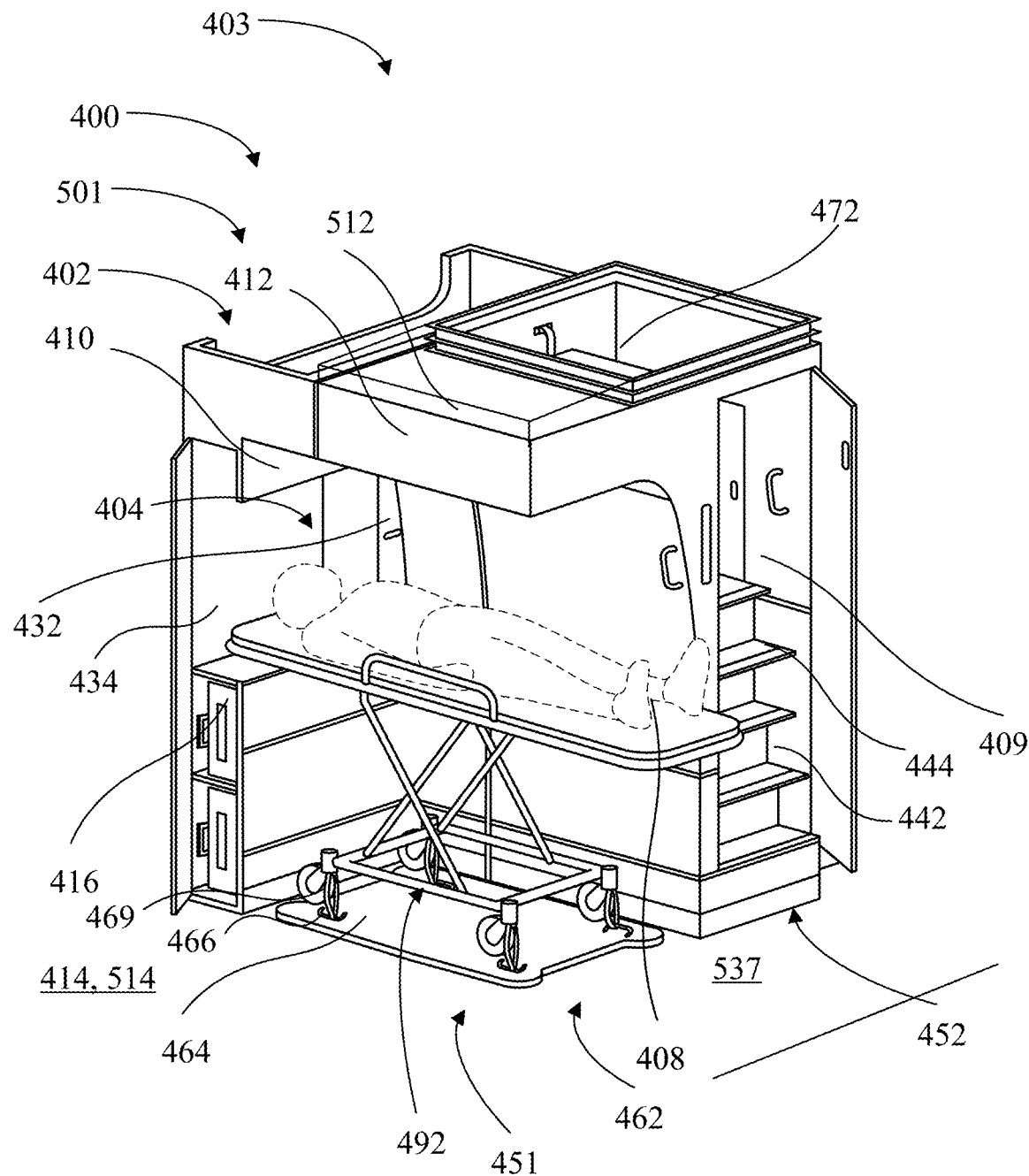
FIG. 4B is a perspective view of a monument in a second configuration configured to receive an occupied stretcher, in accordance with one or more embodiments of this disclosure.

Referring now to FIGS. 4A and 4B, a perspective view of a monument 400 (e.g., a multi-use monument) in use in a first configuration 401 with an occupied wheelchair 491 (FIG. 4A) and in a second configuration 403 with an occupied stretcher 492 (FIG. 4B) are illustrated in accordance with various embodiments. In various embodiments, any of the features from the monument 100, 200, 300 previously disclosed herein could be included in the monument 400. The present disclosure is not limited in this regard.

In various embodiments, the monument 400 is configured for installation in a passenger cabin 501 of an aircraft. In various embodiments, the passenger cabin 501 of an aircraft includes a floor 514, a ceiling 512, and at least one aisle (e.g., aisle 535 and/or aisle 537). In various embodiments, the floor 414 can be an element of the monument 400 or an element of the aircraft. Similarly, in various embodiments, the interior ceiling 412 can be an element of the monument 400 or an element of the passenger cabin 501 of an aircraft. The present disclosure is not limited in this regard. In various embodiments, the interior ceiling 412 is an element of the monument 400 and is configured to be installed into the passenger cabin 501 of an aircraft and coupled to a respective ceiling 512 of the passenger cabin 501 of an aircraft. In this regard, in response to coupling the interior ceiling 412 to a ceiling of a passenger cabin 501 of an aircraft (e.g., ceiling 512), a staircase can be configured to provide access to a crew rest from the main cabin, in accordance with various embodiments.

In various embodiments, the monument 400 comprises a housing 402 configured to extend from the floor 514 of the passenger cabin 501 of an aircraft upwardly toward the ceiling 512 of the passenger cabin 501 of an aircraft. The housing 402 comprises a first interior wall 408 and a second interior wall 410. The second interior wall 410 extends from the first interior wall 408 toward the aisle 535 of the passenger cabin 501 of an aircraft (e.g., a longitudinal aisle 134 or a lateral aisle 136 from FIG. 1.

In various embodiments, an interior space 442 is formed in the housing 402, and a staircase 444 is disposed within the interior space 442. In various embodiments, the interior space 442 can be accessible by a door 446. In this regard, the door 446 is configured to provide access to the interior space 442 from an external space relative to the first interior space (e.g., from the passenger cabin 501 of an aircraft). In various embodiments, the housing 402 further comprises a third interior wall 409 spaced apart from the first interior wall 408. In this regard, the third interior wall 409 and the first interior wall 408 can at least partially define the interior space 442. The interior space 442 is configured to connect the passenger cabin 501 of an aircraft to a crew rest disposed above the passenger cabin 501 of an aircraft, in accordance with various embodiments, as described further herein.

In various embodiments, a second interior space (e.g., interior space 404) is formed in the housing. The interior space 404 is defined at least partially by the first interior wall 408 positioned adjacent to the staircase 444, a second interior wall 410 positioned adjacent to the aisle 535, and an interior ceiling 412 positioned adjacent to the ceiling 512. The interior space 404 extends from a first end of the housing to a second end of the housing 402. In various embodiments, the interior space 404 can have a lateral opening and a longitudinal opening (e.g., adjacent to the aisle 535 and adjacent to the aisle 537. However, the present disclosure is not limited in this regard. For example, the housing 402 could include interior wall (e.g., interior wall 108 from FIG. 1A or interior wall 208 from FIG. 2A) spaced apart from the interior wall 408 to further define the interior space 404 and would still be within the scope of this disclosure.

In various embodiments, the housing 402 comprises a first configuration 401 (FIG. 4A) and a second configuration 403 (FIG. 4B). In various embodiments, the housing 402 is configured to transition between the first configuration 401 and the second configuration 403. In this regard, the first configuration 401 is configured to receive a wheelchair in an unfolded condition (e.g., occupied wheelchair 491) in the interior space 404, and the second configuration 403 configured to receive a stretcher in an unfolded condition (e.g., occupied stretcher 492). In various embodiments, the housing 402 further comprising a compartment 434 and a door 432 disposed adjacent to the interior space 404. In various embodiments the door 432 is configured to transition between a closed state (e.g., first configuration 401 from FIG. 4A) that blocks access to the compartment 434, and an open state (e.g., second configuration 403 from FIG. 4B) that provides access to the compartment 434. In this regard, to accommodate additional space for the occupied stretcher 492 in the second configuration 403, the compartment 434 can be transitioned from the closed state (e.g., first configuration 401 from FIG. 4A) to the open configuration (e.g., second configuration 403 from FIG. 4B). In various embodiments, the door 432 can be slidingly coupled to the interior wall 410, pivotably coupled to the interior wall 410, rotatably coupled to the interior wall, or coupled to the interior wall 410 in any other manner that may be readily apparent to one skilled in the art.

In various embodiments, the compartment 434 is configured to receive a portion of the stretcher (e.g., the occupied stretcher 492) in the second configuration 403. For example, a head end, or a tail end of the occupied stretcher 492 may extend into the compartment 434 in response to loading the occupied stretcher and securing the occupied stretcher 492 therein.

In various embodiments, the compartment 434 is closed in the first configuration 401. However, the present disclosure is not limited in this regard. For example, the compartment 434 can be opened and used by an individual in an occupied wheelchair 491 and still be within the scope of this disclosure.

In various embodiments, the monument 400 comprises an entrance 451 (e.g., an opening to one or more aisles, such as aisle 535 or aisle 537). Although the entrance 451 is illustrated as opening into the one or more aisles (e.g., aisle 535 and/or aisle 537), the present disclosure is not limited in this regard. For example, the monument 400 could include an additional interior wall as described previously herein, the monument 400 could include one or more doors for accessing the interior space 404, or include any other configuration as disclosed herein and be within the scope of this disclosure.

In various embodiments, the monument 400 further comprises an entrance 452 through a door 446 to the interior space 442. In this regard, the interior space 442 can be concealed from passengers during boarding and during typical operation of an aircraft, and accessible by crew as needed, in accordance with various embodiments.

In various embodiments, the monument 400 further comprises a securement assembly 462 positionable on the floor (e.g., floor 514 of the passenger cabin 501 of an aircraft or the floor 414 of the monument 400). In this regard, the securement assembly 462 is configured to secure one of the wheelchair (e.g., occupied wheelchair 491) or the stretcher (e.g., occupied stretcher 492) in place within the interior space 404.

In various embodiments, the monument 400 further comprises a securement assembly 462 positionable on the floor (e.g., floor 514 of the passenger cabin 501 of an aircraft or the floor 414 of the monument 400). In this regard, the securement assembly 462 is configured to secure one of the wheelchair (e.g., occupied wheelchair 491) or the stretcher (e.g., occupied stretcher 492) in place within the interior space 404. In various embodiments, the securement assembly 462 at least two of a retractable tic-down (e.g., attachment 466) mounted to the platform 464, and at least two corresponding tie-down straps 468 for attachment between a respective attachment 466 and the wheelchair. In use, tie-downs and strap may be positioned at the front, back and sides of the wheelchair. In various embodiments, the platform may be integrated into the floor 514 of the passenger cabin 501 to eliminate a step-up/step-down. Although described herein as utilizing tic-down straps 468 and a retractable tie down 466, the present disclosure is not limited in this regard. For example, any securement mechanism capable of securing a wheeled vehicle (e.g., an occupied wheelchair 491 or an occupied stretcher 492) to a platform 464 (or a floor 414, 514) is within the scope of this disclosure. For example, a clamp for locking wheels in place, a hook for securing a wheel to the platform 464, or any other securement mechanism that may be readily apparent to one skilled in the art is within the scope of this disclosure. In various embodiments, tie down straps 469 for securing an occupied stretcher 492 can be a different type of strap relative to the tie-down straps 468. In this regard, the tie down straps 469 can be shorter in length or have any other differing features from the tic-down straps 468, in accordance with various embodiments. However, the present disclosure is not limited in this regard. For example, a common tie down strap could be utilized and would still be within the scope of this disclosure.

In various embodiments, the monument 400 further comprises at least one storage compartment (e.g., storage compartment 416 and/or storage compartment 418) positioned in the housing. In various embodiments, each of the at least one storage compartment can be disposed below the compartment 434. However, the present disclosure is not limited in this regard, and other locations, such as in the interior ceiling 412 for a storage compartment are within the scope of this disclosure. In various embodiments, the at least one storage compartment comprises a first storage compartment (e.g., storage compartment 416) positioned in a space formed in the interior wall 410. In various embodiments, the at least one storage compartment comprises a second storage compartment (e.g., storage compartment 418) spaced apparat vertically from the first storage compartment (e.g., storage compartment 416).

In various embodiments, the monument 400 further comprising an opening 472 disposed in the interior ceiling 412 of the monument 400. In this regard, the opening 472 can define an exit of the staircase 444. Although illustrated as being in an open state, the present disclosure is not limited in this regard. For example, the opening 472 could be configured to be closed by a hatch or a similar mechanism and would still be within the scope of this disclosure.

Figure 5:
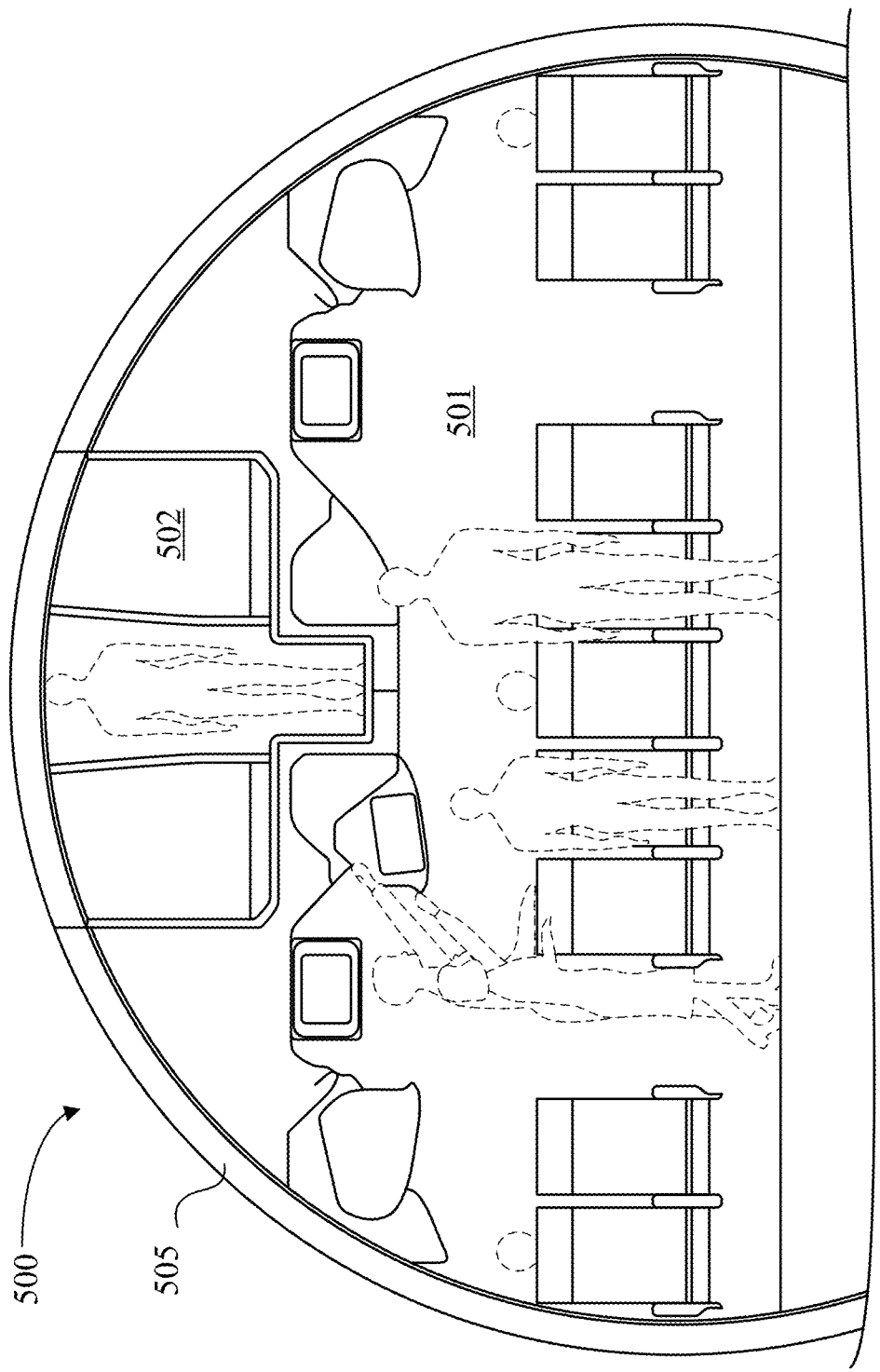
FIG. 5 is a front view of a portion of an aircraft, in accordance with one or more embodiments of this disclosure.

Referring now to FIG. 5, a front view of a portion of an aircraft 500 is illustrated, in accordance with various embodiments. The aircraft 500 comprises a fuselage 505. Disposed within the fuselage 505 is the passenger cabin 501 and a crew rest cabin 502. In various embodiments, the crew rest cabin 502 is disposed above the passenger cabin 501 (e.g., in a ceiling of the passenger cabin 501), in accordance with various embodiments. In various embodiments, the aircraft 500 comprises the passenger cabin 501, which is at least partially defined by the fuselage 505 of the aircraft 500, and a crew rest cabin 502 that is disposed above the passenger cabin 501.

Figure 6:
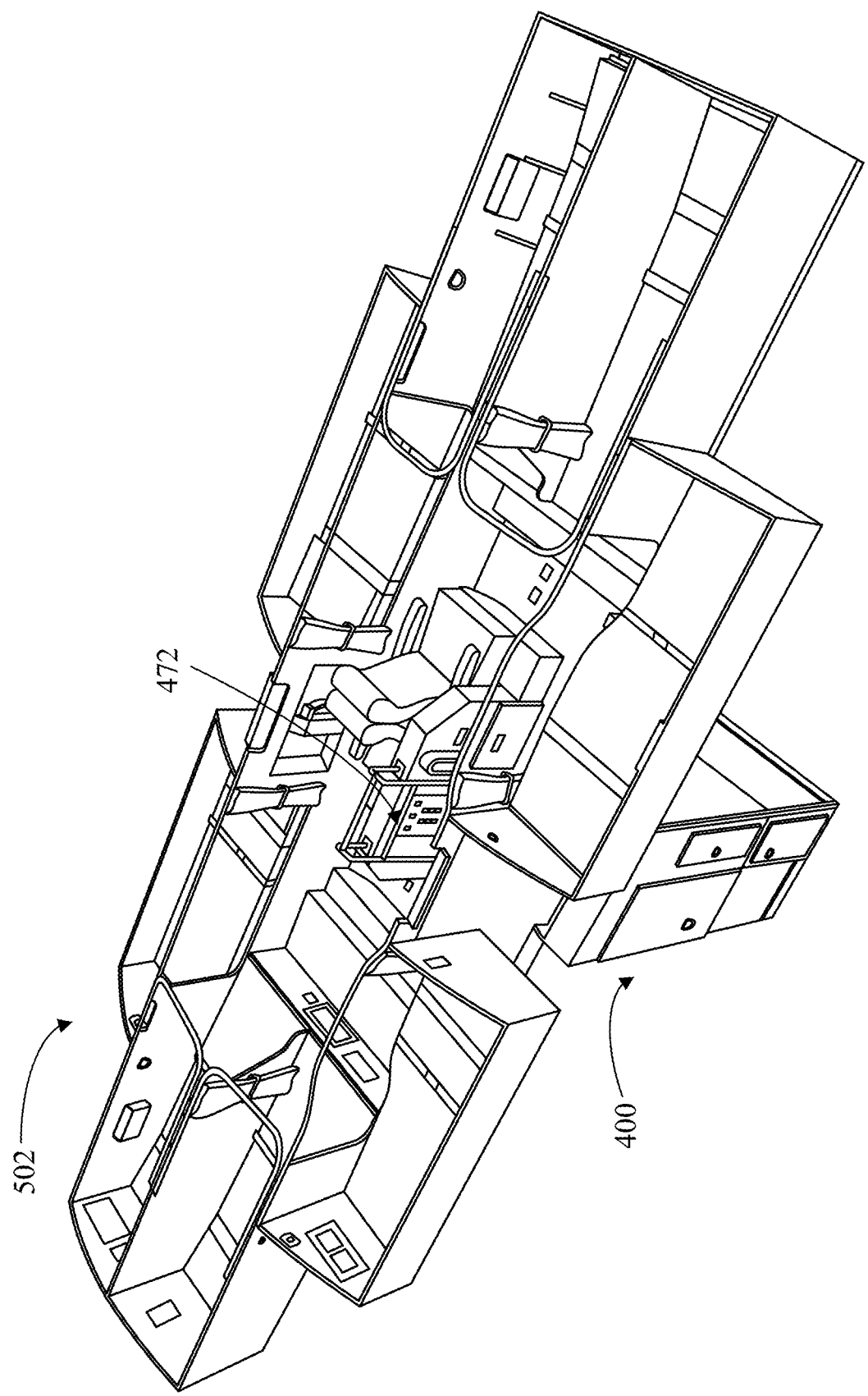
FIG. 6 is a top-down perspective view of a crew rest cabin in an aircraft, in accordance with one or more embodiments of this disclosure.

Referring now to FIG. 6, a top-down perspective view of the crew rest cabin 502 is illustrated in accordance with various embodiments. As shown in FIG. 6, the opening 472 of the monument 400 can open into the crew rest cabin 502, providing access for a crew member from the passenger cabin 501 into the crew rest cabin 502, in accordance with various embodiments. In this regard, the staircase 444 of the monument 400 is configured to extend from the passenger cabin 501 to the crew rest cabin 502. In various embodiments, the monument 400 in an aircraft that includes a crew rest cabin 502 can provide ample space for boarding and securing an occupied stretcher (e.g., occupied stretcher 492 from FIG. 4B) or an occupied wheelchair (e.g., occupied wheelchair 491 from FIG. 4A). For example, the envelope for the monument 400 may be larger relative to typical monument envelopes. Accordingly, the size of the monument 400 can enable additional space to facilitate the occupied stretcher 492 from FIG. 4B, in accordance with various embodiments.

Figure 7:
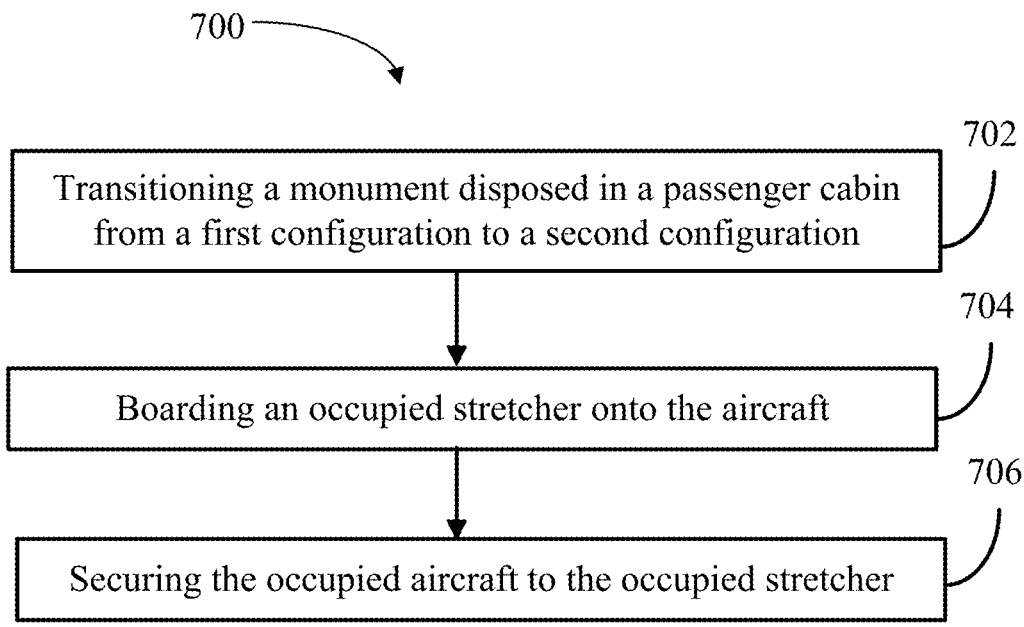
FIG. 7 is a method of boarding an occupied stretcher onto an aircraft, in accordance with various embodiments.

Referring now to FIG. 7, a method 700 of boarding an occupied stretcher onto an aircraft is illustrated, in accordance with various embodiments. The method 700 comprises transitioning a monument disposed in a passenger cabin from a first configuration to a second configuration, the first configuration configured to receive an occupied wheelchair, the second configuration configured to receive the occupied stretcher (step 702). In various embodiments, the method 700 further comprises boarding an occupied stretcher onto the aircraft (step 704). In various embodiments, the method 700 further comprises securing, via a securement assembly positionable on a floor of the aircraft, the occupied stretcher to the floor of the aircraft (step 706).

In various embodiments, the transitioning the monument from the first configuration to the second configuration comprises opening a compartment disposed in an interior wall of the monument. In various embodiments, responsive to the boarding the occupied stretcher, a portion of the occupied stretcher extends into the compartment. In various embodiments, the monument comprises a first interior space configured to receive the occupied stretcher and a second interior space with a staircase configured to provide access to a crew rest.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above-described concepts can be used alone or in combination with any or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible considering the above teaching.

What is claimed is:

1. A monument for installation in an aircraft passenger cabin having a floor and a ceiling, and an aisle, the monument comprising:
   a housing comprising a first interior wall, a second interior wall, a first configuration, and a second configuration, the housing extending from the floor upwardly toward the ceiling, the second interior wall extending from the first interior wall toward the aisle, the first configuration configured to receive a wheelchair in a first unfolded condition within a second interior space of the housing, the second configuration configured to receive at least a first portion of a wheeled stretcher in a second unfolded condition within the second interior space of the housing;
   a first interior space formed in the housing;
   a staircase disposed within the first interior space;
   the second interior space formed in the housing, the second interior space defined at least partially by the first interior wall positioned adjacent to the staircase, the second interior wall positioned adjacent to the aisle, and an interior ceiling positioned adjacent to the ceiling, the second interior space extending from a first end of the housing to a second end of the housing;
   a first entrance into the first interior space through a door;
   a second entrance into the second interior space of the housing; and
   a securement assembly that is positionable on the floor, the securement assembly configured to secure the wheelchair in the first configuration and the wheeled stretcher in the second configuration in place within the second interior space of the housing.

2. The monument of claim 1, further comprising at least one storage compartment positioned in the housing.

3. The monument of claim 2, wherein the at least one storage compartment comprises first storage compartment positioned in a space formed in the second interior wall.

4. The monument of claim 3, wherein the at least one storage compartment comprises a second storage compartment spaced apart vertically from the first storage compartment.

5. The monument of claim 1, further comprising a compartment disposed in the second interior wall, wherein:
   the compartment is configured to receive a second portion of the wheeled stretcher in the second configuration; and
   the compartment is closed in the first configuration.

6. The monument of claim 1, further comprising a third interior wall spaced apart from the first interior wall, wherein the third interior wall and the first interior wall at least partially define the first interior space.

7. The monument of claim 6, wherein the door is configured to provide access to the first interior space from an external space relative to the first interior space.

8. The monument of claim 7, further comprising an opening disposed in the ceiling, wherein the opening defines an exit of the staircase.

9. An aircraft comprising the monument of claim 1.

10. The aircraft of claim 9, further comprising an aircraft cabin defined by a fuselage of the aircraft and a crew rest cabin disposed above the aircraft cabin.

11. The aircraft of claim 10, wherein the staircase is configured to extend from the aircraft cabin to the crew rest cabin.

12. An aircraft comprising:
   a fuselage;
   a passenger cabin disposed in the fuselage;
   a crew rest cabin disposed in the fuselage, the crew rest cabin disposed above the passenger cabin; and
   a monument comprising a staircase that provides access to the crew rest cabin from the passenger cabin, the monument disposed in the passenger cabin, the monument comprising an interior space configured to receive a wheelchair in a first unfolded condition in a first configuration and receive at least a portion of a wheeled stretcher in a second unfolded condition in a second configuration, the monument further comprising a securement assembly positioned on a floor, the securement assembly configured to secure one of the occupied wheelchair in the first configuration and the occupied wheeled stretcher in the second configuration within the interior space during operation of the aircraft.

13. The aircraft of claim 12, wherein the monument is configured to transition between the first configuration for receiving the occupied wheelchair and the second configuration for receiving the occupied wheeled stretcher.

14. The aircraft of claim 13, wherein the monument further comprises a compartment disposed in an interior wall of the monument, wherein the compartment is closed in the first configuration, and wherein the compartment is open in the second configuration.

15. The aircraft of claim 12, wherein the monument further comprises an interior wall separating a first interior space configured to receive the occupied wheelchair or the occupied wheeled stretcher, and a second interior space comprising the staircase.

16. A method of boarding an occupied wheeled stretcher onto an aircraft, the method comprising:
transitioning a monument disposed in a passenger cabin from a first configuration to a second configuration, the first configuration configured to receive an occupied wheelchair within an interior space of the monument, the second configuration configured to receive at least a first portion of the occupied wheeled stretcher within the interior space of the monument;
boarding the occupied wheeled stretcher onto the aircraft; and
securing, via a securement assembly positioned on a floor of the aircraft, the occupied wheeled stretcher to the floor of the aircraft.

17. The method of claim 16, wherein the transitioning the monument from the first configuration to the second configuration comprises opening a compartment disposed in an interior wall of the monument.

18. The method of claim 17, wherein responsive to the boarding the occupied wheeled stretcher, a second portion of the occupied wheeled stretcher extends into the compartment.

19. The method of claim 16, wherein the monument comprises a first interior space configured to receive the occupied wheeled stretcher and a second interior space with a staircase configured to provide access to a crew rest.

* * * * *